US012671134B2

(12) United States Patent
Ma

(10) Patent No.: US 12,671,134 B2
(45) Date of Patent: Jun. 30, 2026

(54) UMBRELLA HUB AND BATTERY PACK ASSEMBLY

(71) Applicant: Qingdao Activa Shade Inc., Shandong (CN)

(72) Inventor: Zhun-An Ma, Ningbo (CN)

(73) Assignee: Qingdao Activa Shade Inc., Shandong (CN)

( * ) Notice: Subject to any disclaimer, the term of this patent is extended or adjusted under 35 U.S.C. 154(b) by 292 days.

(21) Appl. No.: 18/455,475

(22) Filed: Aug. 24, 2023

(65) Prior Publication Data

US 2024/0072357 A1 Feb. 29, 2024

Related U.S. Application Data

(60) Provisional application No. 63/373,681, filed on Aug. 26, 2022.

(51) Int. Cl.
H01M 50/247 (2021.01)
A45B 23/00 (2006.01)
(Continued)

(52) U.S. Cl.
CPC .......... H01M 50/247 (2021.01); A45B 23/00 (2013.01); A45B 25/06 (2013.01); H01M 10/425 (2013.01);
(Continued)

(58) Field of Classification Search
CPC ............ H01M 50/247; H01M 10/425; H01M 50/202; H01M 50/244; H01M 2220/30; A45B 2032/0012; A45B 2200/1009
(Continued)

(56) References Cited

U.S. PATENT DOCUMENTS 2,047,045 A 7/1936 Veenboer
2,087,537 A 7/1937 Milton
(Continued)

FOREIGN PATENT DOCUMENTS

CN 86200207 1/1986
CN 2060634 8/1990
(Continued)

OTHER PUBLICATIONS

Treasure Garden 2013 Product Catalog, copyright 2012, Treasure Garden, Inc., "Serenata Umbrella Lights", pp. 86-87.
(Continued)

*Primary Examiner* — Robert Canfield
(74) *Attorney, Agent, or Firm* — Knobbe, Martens, Olson & Bear, LLP

(57) ABSTRACT

An umbrella hub is provided that includes a body, a power receptacle, and an upwardly facing support surface. The body extends from an outer periphery and along a top portion and a bottom portion of the umbrella hub. The body is configured for connection of umbrella structural members, such as ribs and/or struts, thereto. The power receptacle projects from a bottom portion or other portion of the body. The power receptacle has an opening configured to receive at least a portion of a battery pack therein. The upwardly facing support surface is disposed within or adjacent to the opening. The upwardly facing support surface is configured to be disposed under a downwardly facing surface of a battery pack when the battery pack is inserted into the opening to support the battery pack at a fixed elevation relative to the body of the umbrella hub.

24 Claims, 15 Drawing Sheets

(51) Int. Cl.

| | | |
|---|---|---|
| *A45B 25/06* | (2006.01) | |
| *A45B 25/10* | (2006.01) | |
| *A45B 25/18* | (2006.01) | |
| *H01M 10/42* | (2006.01) | |
| *H01M 50/202* | (2021.01) | |
| *H01M 50/244* | (2021.01) | |

(52) U.S. Cl.

CPC ....... *H01M 50/202* (2021.01); *H01M 50/244* (2021.01); *A45B 2023/0012* (2013.01); *A45B 2200/1009* (2013.01); *H01M 2220/30* (2013.01)

(58) Field of Classification Search

USPC .......... 429/96–100, 163, 176; D13/103, 108, D13/119; 320/112, 115

See application file for complete search history.

(56) References Cited

U.S. PATENT DOCUMENTS

| | | | | |
|---|---|---|---|---|
| 2,176,667 A | | 10/1939 | Crowley | |
| 2,547,896 A | | 4/1951 | Cafardi | |
| 2,953,145 A | | 9/1960 | Moss et al. | |
| 2,960,094 A | | 11/1960 | Cohen | |
| 3,449,002 A | | 6/1969 | Bernard | |
| 3,644,873 A | * | 2/1972 | Dalton | H01R 13/703 |
| | | | | 439/297 |
| 3,683,172 A | | 8/1972 | Noyes | |
| 3,752,407 A | | 8/1973 | Baugh | |
| 3,801,809 A | | 4/1974 | Slade | |
| 3,929,146 A | | 12/1975 | Maiken | |
| 4,020,858 A | | 5/1977 | Wilson | |
| 4,174,532 A | | 11/1979 | Kelley | |
| 4,225,909 A | | 9/1980 | Whiteway | |
| 4,425,602 A | | 1/1984 | Lansing | |
| D283,647 S | | 4/1986 | Schumann | |
| 4,601,120 A | | 7/1986 | Levin | |
| 4,628,791 A | | 12/1986 | Phipps | |
| 4,684,230 A | | 8/1987 | Smith | |
| 4,787,019 A | | 11/1988 | van den Broeke | |
| 4,788,995 A | | 12/1988 | Rushing | |
| 4,800,909 A | | 1/1989 | Seidel et al. | |
| 4,867,187 A | | 9/1989 | Divine | |
| 4,872,468 A | | 10/1989 | Cole | |
| 4,881,154 A | | 11/1989 | Tseng | |
| 4,915,670 A | | 4/1990 | Nesbit | |
| 4,953,839 A | | 9/1990 | Chern | |
| 4,962,779 A | | 10/1990 | Meng | |
| 4,999,060 A | | 3/1991 | Szekely et al. | |
| 5,007,811 A | | 4/1991 | Hopkins | |
| 5,029,239 A | | 7/1991 | Nesbit | |
| 5,053,931 A | | 10/1991 | Rushing | |
| 5,055,984 A | | 10/1991 | Hung et al. | |
| 5,116,258 A | | 5/1992 | Vennik | |
| 5,126,922 A | | 6/1992 | Jacinto | |
| 5,143,108 A | | 9/1992 | Kenney | |
| 5,150,963 A | | 9/1992 | Hill | |
| 5,152,495 A | | 10/1992 | Jacinto | |
| 5,163,752 A | | 11/1992 | Copeland et al. | |
| 5,172,711 A | | 12/1992 | Mueller | |
| 5,207,238 A | | 5/1993 | Rivera et al. | |
| 5,213,122 A | | 5/1993 | Grady | |
| 5,216,948 A | | 6/1993 | Sheppard et al. | |
| 5,222,799 A | | 6/1993 | Sears et al. | |
| D341,831 S | | 11/1993 | Mozdzanowski | |
| 5,273,062 A | | 12/1993 | Mozdzanowski | |
| 5,275,364 A | | 1/1994 | Burger | |
| 5,280,799 A | | 1/1994 | Alajajian | |
| 5,291,908 A | | 3/1994 | Grady, II | |
| 5,321,579 A | | 6/1994 | Brown et al. | |
| 5,323,798 A | | 6/1994 | Yang | |
| 5,331,524 A | | 7/1994 | Tseng | |
| 5,349,975 A | | 9/1994 | Valdner | |
| 5,351,173 A | | 9/1994 | Byrne | |

| | | | | |
|---|---|---|---|---|
| 5,357,185 A | * | 10/1994 | Chen | H02J 7/0045 |
| | | | | 320/110 |
| 5,401,591 A | * | 3/1995 | Bishay | H01M 50/213 |
| | | | | 429/97 |
| 5,422,801 A | | 6/1995 | Sangalli, Jr. | |
| 5,426,577 A | | 6/1995 | Gordin et al. | |
| 5,449,012 A | | 9/1995 | Friedman | |
| 5,463,535 A | | 10/1995 | Vest | |
| 5,499,646 A | | 3/1996 | Lee | |
| 5,502,624 A | | 3/1996 | Tu | |
| 5,508,123 A | * | 4/1996 | Fan | H01M 50/213 |
| | | | | 429/96 |
| 5,584,564 A | | 12/1996 | Phyle | |
| 5,611,614 A | | 3/1997 | Morgan | |
| 5,683,064 A | | 11/1997 | Copeland et al. | |
| 5,683,070 A | | 11/1997 | Seed | |
| 5,707,135 A | | 1/1998 | Miller | |
| 5,758,948 A | | 6/1998 | Hale | |
| 5,816,685 A | | 10/1998 | Hou | |
| 5,831,413 A | | 11/1998 | Gould | |
| 5,860,728 A | | 1/1999 | Maglica | |
| 5,902,080 A | | 5/1999 | Kopras | |
| D410,892 S | * | 6/1999 | Prior | D13/103 |
| 5,911,233 A | | 6/1999 | Wu | |
| D413,992 S | | 9/1999 | Muhammad | |
| 5,954,417 A | | 9/1999 | Mai | |
| 5,960,805 A | | 10/1999 | Murphy | |
| 5,964,233 A | | 10/1999 | Clark et al. | |
| 5,996,511 A | | 12/1999 | Swoger | |
| 5,999,102 A | * | 12/1999 | Mitsui | H01M 10/4257 |
| | | | | 320/112 |
| 6,007,939 A | * | 12/1999 | Clowers | H01M 50/213 |
| | | | | 429/100 |
| 6,013,985 A | | 1/2000 | Green et al. | |
| 6,017,188 A | | 1/2000 | Benton | |
| 6,024,464 A | | 2/2000 | De Vera | |
| 6,027,309 A | | 2/2000 | Rawls | |
| 6,039,062 A | | 3/2000 | Karakaedos | |
| 6,058,951 A | | 5/2000 | Wilson | |
| 6,089,727 A | | 7/2000 | Wu | |
| 6,126,291 A | | 10/2000 | Chung-Kuang et al. | |
| 6,126,293 A | | 10/2000 | Wu | |
| 6,134,103 A | | 10/2000 | Ghanma | |
| 6,135,605 A | | 10/2000 | Hsu | |
| 6,138,970 A | | 10/2000 | Sohrt | |
| 6,158,451 A | | 12/2000 | Wu | |
| 6,158,701 A | | 12/2000 | Deshler | |
| 6,196,242 B1 | | 3/2001 | Xu | |
| 6,230,728 B1 | | 5/2001 | Reese | |
| 6,270,230 B1 | | 8/2001 | Mai | |
| 6,283,610 B1 | | 9/2001 | Alajajian | |
| 6,298,866 B1 | | 10/2001 | Molnar, IV | |
| 6,302,560 B1 | | 10/2001 | Lai | |
| 6,340,233 B1 | | 1/2002 | Shieh | |
| 6,341,873 B1 | | 1/2002 | Tai | |
| 6,347,776 B1 | | 2/2002 | Chuang | |
| 6,382,809 B1 | | 5/2002 | Ou-Yang | |
| 6,397,869 B1 | | 6/2002 | Jennings | |
| 6,401,735 B1 | | 6/2002 | Chou | |
| 6,412,889 B1 | | 7/2002 | Hummell et al. | |
| 6,439,249 B1 | | 8/2002 | Pan et al. | |
| 6,439,732 B1 | | 8/2002 | Weisbach et al. | |
| 6,499,856 B2 | | 12/2002 | Lee | |
| 6,519,144 B1 | | 2/2003 | Henrie et al. | |
| D476,948 S | * | 7/2003 | Mitchell | D13/103 |
| 6,598,990 B2 | | 7/2003 | Li | |
| 6,605,923 B1 | * | 8/2003 | Kellogg | H02J 7/0045 |
| | | | | 320/112 |
| 6,612,713 B1 | | 9/2003 | Kuelbs | |
| 6,636,918 B1 | | 10/2003 | Aguilar et al. | |
| 6,659,616 B1 | | 12/2003 | Bilotti | |
| 6,666,224 B2 | | 12/2003 | Lee | |
| 6,682,204 B2 | | 1/2004 | Mullally et al. | |
| 6,692,135 B2 | | 2/2004 | Li | |
| D488,436 S | * | 4/2004 | Wulff | D13/103 |
| 6,732,752 B2 | | 5/2004 | Cohen et al. | |
| 6,749,166 B2 | | 6/2004 | Valentine et al. | |
| 6,765,789 B2 | | 7/2004 | Yang | |
| 6,796,318 B2 | | 9/2004 | Cohen et al. | |

(56) References Cited

U.S. PATENT DOCUMENTS

| | | | |
|---|---|---|---|
| 6,830,058 B2 | 12/2004 | Li | |
| 6,837,255 B2 | 1/2005 | Bunch | |
| 6,840,657 B2 | 1/2005 | Tung | |
| 6,851,823 B2 | 2/2005 | Bilotti | |
| 6,923,193 B2 | 8/2005 | Chen | |
| 6,923,194 B2 | 8/2005 | Li | |
| 6,959,996 B2 | 11/2005 | Ip | |
| 6,961,237 B2 | 11/2005 | Dickie | |
| 6,966,667 B2 | 11/2005 | Li | |
| 7,013,903 B2 | 3/2006 | Li | |
| 7,017,598 B2 | 3/2006 | Nipke | |
| 7,021,787 B1 | 4/2006 | Kuelbs | |
| 7,034,902 B2 | 4/2006 | Tajima | |
| 7,063,433 B2 | 6/2006 | Pape et al. | |
| D528,975 S * | 9/2006 | Chi | D13/103 |
| 7,102,328 B2 * | 9/2006 | Long | H02J 7/0044 |
| | | | 320/115 |
| 7,108,388 B2 | 9/2006 | Li | |
| 7,111,954 B1 | 9/2006 | Lai | |
| 7,125,133 B2 | 10/2006 | Bilotti et al. | |
| 7,128,076 B2 | 10/2006 | Freedman | |
| 7,134,762 B2 | 11/2006 | Ma | |
| 7,143,601 B1 | 12/2006 | Jimenez | |
| 7,156,114 B2 | 1/2007 | Lo | |
| 7,174,908 B2 | 2/2007 | Chen | |
| 7,188,633 B2 | 3/2007 | Zerillo | |
| D542,454 S | 5/2007 | Chan | |
| D545,268 S * | 6/2007 | Shiu | D13/103 |
| D547,264 S * | 7/2007 | Kondo | D13/103 |
| 7,243,734 B2 * | 7/2007 | Wu | H01M 50/244 |
| | | | 173/217 |
| 7,285,934 B2 * | 10/2007 | Chang | F21L 4/005 |
| | | | 320/115 |
| 7,300,189 B2 | 11/2007 | England et al. | |
| 7,331,684 B2 | 2/2008 | Tung | |
| 7,401,936 B1 | 7/2008 | Fan | |
| 7,422,343 B2 | 9/2008 | Li | |
| 7,431,469 B2 | 10/2008 | Li | |
| D580,421 S | 11/2008 | Sculler et al. | |
| 7,481,547 B2 | 1/2009 | Li | |
| 7,497,225 B1 | 3/2009 | Klein, Jr. et al. | |
| 7,497,583 B2 | 3/2009 | Ma | |
| 7,537,015 B1 | 5/2009 | Bender et al. | |
| RE40,848 E * | 7/2009 | Pitzen | A61B 17/1628 |
| | | | 429/97 |
| 7,557,297 B2 | 7/2009 | Axland et al. | |
| 7,557,534 B2 * | 7/2009 | Uehlein-Proctor | B25F 5/02 |
| | | | 320/112 |
| 7,559,520 B2 | 7/2009 | Quijano et al. | |
| 7,562,667 B2 | 7/2009 | Li | |
| D597,482 S * | 8/2009 | Kondo | D13/103 |
| 7,593,220 B2 | 9/2009 | Proctor et al. | |
| 7,604,015 B2 | 10/2009 | Fraser | |
| 7,614,600 B1 | 11/2009 | Smith et al. | |
| 7,619,387 B2 * | 11/2009 | Amend | H01M 50/244 |
| | | | 439/352 |
| 7,625,241 B2 | 12/2009 | Axland et al. | |
| 7,625,242 B2 | 12/2009 | Axland et al. | |
| 7,626,119 B2 | 12/2009 | Axland et al. | |
| 7,631,653 B2 | 12/2009 | Young | |
| D607,814 S * | 1/2010 | Tsuzuki | D13/103 |
| 7,645,169 B2 | 1/2010 | Axland et al. | |
| 7,648,339 B1 | 1/2010 | Ediger et al. | |
| 7,650,230 B1 | 1/2010 | Laverick et al. | |
| 7,665,477 B1 | 2/2010 | Hathaway | |
| 7,695,153 B2 | 4/2010 | Tsai | |
| 7,753,546 B2 | 7/2010 | Kuelbs | |
| 7,755,975 B2 | 7/2010 | Pettersen et al. | |
| 7,778,624 B2 * | 8/2010 | Li | A45B 23/00 |
| | | | 455/344 |
| 7,828,002 B2 | 11/2010 | Boldsen | |
| 7,836,905 B2 | 11/2010 | Tarter et al. | |
| 7,856,996 B2 | 12/2010 | Ma | |
| 7,975,711 B2 | 7/2011 | Li | |
| 8,015,988 B2 | 9/2011 | Li | |
| 8,061,374 B2 | 11/2011 | Li | |
| 8,069,868 B2 | 12/2011 | Kuelbs | |
| 8,082,937 B2 | 12/2011 | Tarter et al. | |
| 8,104,491 B2 | 1/2012 | Li | |
| 8,116,497 B2 | 2/2012 | Li | |
| 8,267,104 B2 | 9/2012 | Li | |
| 8,331,598 B2 * | 12/2012 | Li | G09F 27/00 |
| | | | 381/334 |
| 8,345,889 B2 | 1/2013 | Li | |
| 8,360,079 B2 | 1/2013 | Li | |
| 8,375,966 B2 | 2/2013 | Kuelbs | |
| 8,393,341 B2 | 3/2013 | Li | |
| 8,415,046 B2 * | 4/2013 | Kondo | H01M 50/244 |
| | | | 429/98 |
| D682,195 S * | 5/2013 | Aglassinger | D13/103 |
| 8,444,104 B2 * | 5/2013 | Li | A45B 3/04 |
| | | | 135/16 |
| 8,453,659 B2 | 6/2013 | Li | |
| 8,459,282 B2 | 6/2013 | Gorey et al. | |
| 8,727,555 B2 | 5/2014 | Kuelbs | |
| 8,794,781 B2 | 8/2014 | Kuelbs | |
| D724,592 S | 3/2015 | Han | |
| 9,125,462 B2 | 9/2015 | Akin et al. | |
| 9,468,273 B1 | 10/2016 | Hasselbach et al. | |
| D784,787 S | 4/2017 | Bertani | |
| D786,661 S | 5/2017 | Wright | |
| 9,660,229 B2 * | 5/2017 | Chellew | H01M 50/247 |
| D790,454 S * | 6/2017 | Lee | D13/103 |
| D800,058 S * | 10/2017 | Qiu | D13/103 |
| D813,525 S | 3/2018 | Ma | |
| D814,173 S | 4/2018 | Ma | |
| D818,949 S * | 5/2018 | Dunkin | D13/103 |
| D827,686 S | 9/2018 | Weber | |
| D833,137 S | 11/2018 | Ma | |
| D838,099 S | 1/2019 | Kaufmann | |
| D846,623 S | 4/2019 | Siminoff | |
| 10,398,049 B2 | 8/2019 | Ma | |
| D869,387 S * | 12/2019 | Ensing | D13/103 |
| 10,511,008 B2 * | 12/2019 | Brush | B25F 5/02 |
| 10,631,603 B2 | 4/2020 | Ma | |
| D908,082 S * | 1/2021 | Lundbaeck | D13/103 |
| D909,042 S | 2/2021 | Holbrook | |
| D911,932 S * | 3/2021 | Ensing | D13/103 |
| D921,580 S * | 6/2021 | Duman | D13/103 |
| D923,562 S * | 6/2021 | Ensing | D13/103 |
| D927,416 S * | 8/2021 | Chen | D13/103 |
| D949,782 S * | 4/2022 | Ensing | D13/103 |
| D952,553 S * | 5/2022 | Matus | D13/103 |
| D956,683 S * | 7/2022 | Baumann | D13/103 |
| D964,266 S * | 9/2022 | Bublitz | H01M 50/213 |
| | | | D13/103 |
| D988,987 S * | 6/2023 | Carlucci | D13/103 |
| D1,001,727 S * | 10/2023 | Pratley | D29/112 |
| 11,944,171 B2 * | 4/2024 | Luo | A45B 23/00 |
| 12,038,167 B2 * | 7/2024 | Chen | A45B 25/06 |
| D1,039,827 S | 8/2024 | Huang | |
| 12,078,328 B2 | 9/2024 | Ma | |
| D1,047,411 S * | 10/2024 | Ma | D3/10 |
| D1,049,609 S * | 11/2024 | Ma | D3/10 |
| D1,102,134 S | 11/2025 | Ma | |
| D1,102,136 S | 11/2025 | Ma | |
| 2001/0001083 A1 | 5/2001 | Helot | |
| 2002/0074027 A1 | 6/2002 | Maidment | |
| 2002/0078985 A1 | 6/2002 | Farr | |
| 2003/0002688 A1 | 1/2003 | Kanevsky et al. | |
| 2003/0067765 A1 | 4/2003 | Li | |
| 2003/0102021 A1 | 6/2003 | Cohen | |
| 2003/0168091 A1 | 9/2003 | Cohen | |
| 2003/0192579 A1 | 10/2003 | Llamas Garijo | |
| 2004/0007259 A1 | 1/2004 | Manolis | |
| 2004/0031513 A1 | 2/2004 | Bunch | |
| 2004/0055627 A1 | 3/2004 | Moga | |
| 2004/0095749 A1 | 5/2004 | Bilotti | |
| 2004/0100791 A1 | 5/2004 | Bilotti | |
| 2004/0149325 A1 | 8/2004 | Juelbs | |
| 2004/0221883 A1 | 11/2004 | Nipke | |
| 2004/0228118 A1 | 11/2004 | Peterson | |
| 2004/0240167 A1 | 12/2004 | Ledbetter | |

(56)References Cited

U.S. PATENT DOCUMENTS

| | | | |
|---|---|---|---|
| 2004/0256852 A1 | 12/2004 | Benedict | |
| 2005/0016571 A1 | 1/2005 | Wu | |
| 2005/0069153 A1 | 3/2005 | Hall | |
| 2005/0072451 A1 | 4/2005 | Vivian | |
| 2005/0105898 A1 | 5/2005 | Bachinski | |
| 2005/0117326 A1 | 6/2005 | Ma | |
| 2005/0128740 A1 | 6/2005 | Currie et al. | |
| 2005/0133077 A1 | 6/2005 | Zerillo | |
| 2005/0146876 A1 | 7/2005 | Li | |
| 2005/0161067 A1 | 7/2005 | Hollins | |
| 2005/0254228 A1 | 11/2005 | Li | |
| 2006/0005867 A1 | 1/2006 | Chang | |
| 2006/0005869 A1 | 1/2006 | Kuelbs | |
| 2006/0044152 A1 | 3/2006 | Wang | |
| 2006/0124122 A1 | 6/2006 | Young | |
| 2006/0124157 A1 | 6/2006 | Bayour | |
| 2006/0127034 A1 | 6/2006 | Brooking | |
| 2006/0196532 A1 | 9/2006 | Tung | |
| 2006/0266398 A1 | 11/2006 | Wu | |
| 2007/0046258 A1* | 3/2007 | Defant | H02J 7/342 |
| | | | 320/115 |
| 2007/0056617 A1 | 3/2007 | Li | |
| 2007/0058360 A1 | 3/2007 | Li | |
| 2007/0070588 A1 | 3/2007 | Lin | |
| 2007/0074751 A1 | 4/2007 | Fraser | |
| 2007/0127231 A1 | 6/2007 | Li | |
| 2007/0133191 A1 | 6/2007 | Ma | |
| 2007/0133219 A1 | 6/2007 | Chaloult et al. | |
| 2007/0151588 A1 | 7/2007 | Jiu et al. | |
| 2007/0242450 A1 | 10/2007 | Blatecky | |
| 2007/0254695 A1 | 11/2007 | Langberg et al. | |
| 2007/0279856 A1 | 12/2007 | Bragg | |
| 2008/0053496 A1 | 3/2008 | Li | |
| 2008/0056898 A1 | 3/2008 | Li | |
| 2008/0062675 A1 | 3/2008 | Tung | |
| 2008/0072945 A1 | 3/2008 | Grand Pre et al. | |
| 2008/0076379 A1 | 3/2008 | Li | |
| 2008/0092440 A1 | 4/2008 | Johnson | |
| 2008/0092936 A1 | 4/2008 | Carabillo | |
| 2008/0095382 A1 | 4/2008 | Mott | |
| 2008/0118089 A1 | 5/2008 | Li | |
| 2008/0118093 A1* | 5/2008 | Klemenz | H04R 25/55 |
| | | | 320/108 |
| 2008/0163908 A1 | 7/2008 | O'Kere | |
| 2008/0238270 A1 | 10/2008 | Wayman et al. | |
| 2008/0262657 A1 | 10/2008 | Howell et al. | |
| 2008/0271768 A1 | 11/2008 | Li | |
| 2008/0284372 A1* | 11/2008 | Cover | H01M 50/213 |
| | | | 600/101 |
| 2008/0292120 A1 | 11/2008 | Wilson | |
| 2009/0014041 A1 | 1/2009 | Li | |
| 2009/0056775 A1 | 3/2009 | Kuelbs | |
| 2009/0058354 A1 | 3/2009 | Harrison | |
| 2009/0071516 A1 | 3/2009 | Li | |
| 2009/0090404 A1 | 4/2009 | Kuelbs | |
| 2009/0120475 A1* | 5/2009 | Li | A45B 3/00 |
| | | | 135/16 |
| 2009/0120476 A1 | 5/2009 | Li | |
| 2009/0193578 A1 | 8/2009 | Jang et al. | |
| 2009/0196020 A1 | 8/2009 | Tsai | |
| 2009/0250982 A1 | 10/2009 | Cohen | |
| 2009/0284216 A1 | 11/2009 | Bessa et al. | |
| 2009/0314319 A1 | 12/2009 | Young | |
| 2009/0320827 A1 | 12/2009 | Thompson et al. | |
| 2010/0024855 A1* | 2/2010 | Li | A45B 25/00 |
| | | | 135/16 |
| 2010/0024856 A1 | 2/2010 | Li | |
| 2010/0097441 A1 | 4/2010 | Trachtenberg | |
| 2010/0154786 A1 | 6/2010 | Li | |
| 2010/0192999 A1 | 8/2010 | Li | |
| 2010/0245032 A1 | 9/2010 | Li | |
| 2010/0307547 A1 | 12/2010 | Li | |
| 2010/0319737 A1 | 12/2010 | Li | |
| 2010/0320819 A1 | 12/2010 | Cohen | |
| 2010/0326849 A1 | 12/2010 | Trimarche | |
| 2011/0005560 A1 | 1/2011 | Nair | |
| 2011/0023931 A1 | 2/2011 | Chen | |
| 2011/0066302 A1 | 3/2011 | McEwan | |
| 2011/0156598 A1* | 6/2011 | Li | A45B 23/00 |
| | | | 135/96 |
| 2011/0157801 A1 | 6/2011 | Satterfield | |
| 2011/0227695 A1 | 9/2011 | Li | |
| 2011/0265694 A1 | 11/2011 | Hampton et al. | |
| 2012/0017958 A1 | 1/2012 | Brockel et al. | |
| 2012/0021269 A1 | 1/2012 | Tartar et al. | |
| 2012/0073616 A1 | 3/2012 | Kuelbs | |
| 2012/0140455 A1 | 6/2012 | Chang | |
| 2014/0246062 A1 | 9/2014 | Ma | |
| 2018/0092203 A1 | 3/2018 | Ma | |
| 2018/0138737 A1* | 5/2018 | Imaz Mazquiaran | H01R 25/006 |
| 2019/0326775 A1* | 10/2019 | Xinyan | E04H 15/10 |
| 2022/0125169 A1 | 4/2022 | Ma | |
| 2022/0223966 A1* | 7/2022 | Nick | H01M 10/6235 |
| 2022/0386749 A1* | 12/2022 | Luo | H02J 7/35 |
| 2022/0386750 A1 | 12/2022 | Clarke | |
| 2023/0380557 A1* | 11/2023 | Zhu | A45B 23/00 |
| 2024/0077196 A1* | 3/2024 | Chen | F21V 23/04 |

FOREIGN PATENT DOCUMENTS

| | | |
|---|---|---|
| CN | 2072349 | 3/1991 |
| CN | 2105201 | 5/1992 |
| CN | 2143064 | 10/1993 |
| CN | 2174881 | 8/1994 |
| CN | 2204114 | 8/1995 |
| CN | 2208826 | 10/1995 |
| CN | 2450938 | 10/2001 |
| CN | 201025354 | 2/2008 |
| CN | 300869059 | 1/2009 |
| CN | 202262527 | 6/2012 |
| CN | 303343070 | 8/2015 |
| CN | 307851015 | 2/2023 |
| DE | 9319387 U1 | 2/1994 |
| DE | 4407188 | 12/1994 |
| FR | 2628950 | 9/1989 |
| FR | 2752512 | 2/1998 |
| GB | 2396205 A | 6/2004 |
| JP | S60-45302 | 3/1985 |
| JP | S60-69022 | 5/1985 |
| JP | H01-117213 | 8/1989 |
| JP | H01-170120 | 12/1989 |
| JP | H04-5906 | 1/1992 |
| JP | H08-158702 | 6/1996 |
| JP | H09-168415 | 6/1997 |
| JP | 2000231910 A * | 8/2000 |
| JP | 2000243367 A * | 9/2000 |
| JP | 2000-354506 | 12/2000 |
| JP | 2002-204710 | 7/2002 |
| JP | 2002-242487 | 8/2002 |
| KR | 301162020.0000 | 5/2022 |
| NL | 9301852 | 5/1995 |
| WO | WO 1990/000840 | 1/1990 |
| WO | WO 1990/06069 A | 6/1990 |
| WO | WO 1993/00840 | 1/1993 |
| WO | WO 1993/005688 A1 | 4/1993 |
| WO | WO 1998/049915 A1 | 11/1998 |
| WO | WO 2000/013541 A1 | 3/2000 |
| WO | WO 2002/069751 A1 | 9/2002 |
| WO | WO 2003/092428 A1 | 11/2003 |
| WO | WO 2004/088076 A1 | 10/2004 |
| WO | WO 2004/102063 | 11/2004 |

OTHER PUBLICATIONS

Treasure Garden 9-Foot Starlux Deluxe Collar-Tilt Market Umbrella, Downloaded from Amazon Jul. 7, 2025, https://www.amazon.com/Treasure-Garden-Collar-Tilt-Umbrella-Sunbrella/dp/B09WF89ZP7.

* cited by examiner

UMBRELLA HUB AND BATTERY PACK ASSEMBLY

INCORPORATION BY REFERENCE TO ANY PRIORITY APPLICATIONS

Any and all applications for which a foreign or domestic priority claim is identified in the Application Data as filed with the present application are hereby incorporated by reference under 37 CFR 1.57.

BACKGROUND

Field of the Invention

This application is directed to umbrella assemblies having a receptacle for mounting a battery pack or other electronic device, e.g., on a hub and to battery packs for such assemblies.

Description of the Related Art

Umbrellas are one well-known form of shade structure usable in a wide variety of settings. Some umbrellas are well-suited to shelter a large area at a pool deck, marketplace, restaurant or at a home setting. Increasingly portable electronic devices are used away from power sources. Portable battery packs are known for powering electronic devices.

SUMMARY

While portable battery packs are known, several factors make the use of these devices inconvenient. Portable battery packs can only be used if they can quickly and easily be found. There is a need to provide a storage location that is convenient for users in a variety of settings, e.g., at the pool, in a restaurant or marketplace and at home. Also, many portable battery packs are charged with cords. For example, a USB charging cord can be used with a power adapter to plug a battery pack into an electrical socket. However, users may find themselves at one of these (or other) locations without the cord, adapter or both. It would be desirable to equip an umbrella with a receptacle to which a battery pack can be directly connected, e.g., without requiring a power adapter, USB or other charging cord or both a cord and adapter. It would be beneficial to provide an umbrella with a source of power, e.g., an AC power connection, a solar energy collector or an AC power connection and a solar energy collector.

In one embodiment, an umbrella assembly is provided that includes an umbrella pole, an upper hub, an array of umbrella ribs, an array of umbrella struts, and a lower hub. The umbrella pole extends from a lower end to an upper end. The upper hub is coupled with the upper end of the umbrella pole. Each umbrella rib of the array of umbrella ribs has a first end coupled with the upper hub and a second end opposite the first end. Each umbrella strut of the array of umbrella struts has a first end coupled with one of the umbrella ribs of the array of umbrella ribs and a second end opposite the first end. The lower hub has an inner periphery disposed about the umbrella pole and moveable there along over a length thereof between the lower end and the upper end. The lower hub includes a hub body, an array of connection zones, and a power receptacle. The hub body extends from the inner periphery to an outer periphery of the lower hub. The hub body also extends between an upper surface of the lower hub and a lower surface of the lower hub. Each strut connection zone of the array of strut connection zones extends from or is located adjacent to the outer periphery of the hub body. Each strut connection zone of the array of strut connection zones is coupled with the second end of one of the umbrella struts of the array of umbrella struts. Movement of the lower hub upward and downward moves the umbrella struts and, indirectly, the umbrella ribs between an open configuration and a closed configuration. The power receptacle projects away from (e.g., below, up into, or both below and up into) the lower surface of the hub body. The power receptacle is disposed between an inner surface disposed adjacent to the inner periphery, an outer surface disposed adjacent to the outer periphery. The power receptacle includes a first end surface that extends between the inner surface and the outer surface and a second end surface that extends between the inner surface and the outer surface opposite the first end surface. A deflectable tab is disposed on one of the first end surface and the second end surface. The umbrella assembly also includes a battery pack. The battery pack includes a housing, a battery cell, and an engagement feature. The housing includes a side profile configured to be received within the power receptacle such that a portion of a length of the housing can be inserted into the power receptacle. The battery cell is disposed in the housing and is configured to supply power or to receive power through a contact disposed at an upper end of the battery pack. The engagement feature is disposed on a side surface of the housing. The engagement feature is configured such that as the housing of the battery pack is inserted into the power receptacle the engagement feature can come to rest on a support of the lower hub adjacent to the first end surface or the second end surface.

In another embodiment, an umbrella hub assembly is provided that includes an inner periphery configured to be disposed about an umbrella pole, an outer periphery disposed outward of the inner periphery, and a hub body that extends between the inner and outer periphery, e.g., from the inner periphery to the outer periphery. The hub body extends between a top portion and a bottom portion of the umbrella hub assembly. The umbrella hub assembly includes an array of strut connection zones, a power receptacle, an upwardly facing support surface, and a battery pack. The array of strut connection zones is disposed in the hub body at or adjacent to the outer periphery. The power receptacle projects from the bottom portion of (e.g., into, away from or away from and into) the hub body. The power receptacle is disposed between a first circumferential surface disposed adjacent to the inner periphery, a second circumferential surface disposed adjacent to the outer periphery, a first end surface that extends between the first circumferential surface and the second circumferential surface, and a second end surface that extends between the first circumferential surface and the second circumferential surface opposite the first end surface. The upwardly facing support surface is disposed on one of the first end surface and the second end surface. The battery pack includes a housing, a battery cell disclosed in the housing, and an engagement feature. The housing has a side profile configured to allow the battery pack to be inserted into the power receptacle such that an upper end portion of the housing can be disposed in the power receptacle. The battery cell is disposed in the housing and is configured to supply or receive power through a contact disposed at an upper end of the battery pack. The engagement feature is disposed on a side surface of the housing. The engagement feature faces away from the upper end. The engagement feature is configured to rest on the upwardly facing support surface to resist unintended removal of the battery pack from the power receptacle.

In another embodiment, an umbrella hub is provided that includes a body, a power receptacle, and an upwardly facing support surface. The body extends from an outer periphery and along a top portion and a bottom portion of the umbrella hub. The body is configured for connection of umbrella structural members, such as ribs and/or struts, thereto. The power receptacle projects from the body, e.g., from a bottom or top portion thereof. The power receptacle has an opening configured to receive at least a portion of a battery pack therein. The upwardly facing support surface is disposed within or adjacent to the opening. The upwardly facing support surface is configured to be disposed under a downwardly facing surface of a battery pack when the battery pack is inserted into the opening to support the battery pack at a fixed elevation relative to the body of the umbrella hub.

In some embodiments, the upwardly facing support surface is deflectable away from the opening as a battery pack is inserted into the opening.

In some embodiments, the power receptacle comprises a cantilevered member having a fixed end coupled with the body of the umbrella hub and a free end opposite the fixed end. The free end comprising the upwardly facing support surface.

In some embodiments, the cantilevered member is a first cantilevered member. The power receptacle further comprising a second cantilevered member on an opposite side of the opening from the first cantilevered member. The second cantilevered member having a free end comprising an upwardly facing support surface.

In some embodiments, an outwardly facing support surface of the cantilevered member is exposed on an outside surface of the body of the umbrella hub.

In some embodiments, the power receptacle is bounded at least partially by a first circumferential surface disposed adjacent to an inner periphery, a second circumferential surface disposed adjacent to the outer periphery, a first end extending between the first circumferential surface and the second circumferential surface, and a second end extending between the first circumferential surface and the second circumferential surface opposite the first end, the upwardly facing support surface disposed on one of the first end and the second end.

In some embodiments, the upwardly facing support surface is a first upwardly facing support surface disposed on the first end and further comprising a second upwardly facing support surface disposed on the second end.

In some embodiments, the opening is a blind opening enclosed by a top surface of the power receptacle. The power receptacle configured to facilitate electrical contact at or through the top surface between a current source and/or a load disposed on or coupled with an umbrella in which the umbrella hub is disposed when a battery pack disposed in the opening.

In some embodiments, the opening is laterally enclosed within lateral walls of the body, an aperture being disposed through one or more of the lateral walls, the upwardly facing support surface along an edge of the aperture.

In some embodiments, the power receptacle further comprising a manual button deflectable toward a central vertical axis of the opening to disengage a battery pack from the opening by separating a supported portion of the battery pack from the upwardly facing support surface.

In another embodiment, an umbrella hub assembly is provided that includes any of the umbrella hubs described herein and a battery pack. The battery pack comprising a housing, a battery cell, and a downwardly facing surface. The housing comprising a side profile configured to allow the battery pack to be inserted into the power receptacle such that an upper portion of the housing can be disposed in the opening. The battery cell disposed in the housing configured to supply or receive power through a contact disposed at an upper end of the battery. The downwardly facing surface disposed on a lateral portion of the housing. The downwardly facing surface facing away from the upper portion. The downwardly facing surface configured to rest on the upwardly facing support surface of the umbrella hub.

In some embodiments, the housing of the battery pack comprises a radially inward facing side, a radially outward facing side and a radial projection projecting away from a radially outward facing surface on the radially outward facing side.

In some embodiments, a circumferential surface comprises a notch configured to receive the radial projection of the housing of the battery pack when the battery pack is fully inserted into the opening.

In some embodiments, the battery pack comprises a user interface disposed on the radial projection. The battery pack further comprising a processor disposed in the housing between the battery cell and the user interface and coupled with the user interface.

In some embodiments, the radial projection extends to a radial position corresponding to the outer periphery of the umbrella hub when the housing is inserted into the opening of the power receptacle.

In some embodiments, the umbrella hub assembly further comprises a magnet disposed in the body of the umbrella hub adjacent to the opening. The battery pack configured to be magnetically attracted to the magnet when the battery pack is inserted into the opening.

In some embodiments, the downwardly facing surface is disposed on a fixed shoulder of the housing.

In some embodiments, the battery pack further comprising a deflectable member disposed on a lateral surface of the housing, the downwardly facing surface being disposed on the deflectable member.

In some embodiments, the opening of the power receptacle is laterally enclosed by a lateral wall of the body, an aperture being disposed through the lateral wall, the upwardly facing support surface being disposed along an edge of the aperture.

In some embodiments, a free end of the deflectable member is configured to deflect toward a longitudinal axis of the housing of the battery pack as the battery pack is inserted into the opening and to un-deflect into the aperture to allow the downwardly facing surface of the deflectable member to rest on the upwardly facing support surface of the umbrella hub.

In some embodiments, the power receptacle comprises a manual button is disposed laterally of the aperture on an outside surface of the body of the umbrella hub, the manual button being deflectable toward a central vertical axis of the opening to deflect the free end of the deflectable member out of contact with the upwardly facing support surface to allow the battery pack to be withdrawn from the opening.

In some embodiments, the opening of the power receptacle is laterally enclosed by a lateral wall of the body, an aperture being disposed through the lateral wall, the upwardly facing support surface being disposed along an edge of the aperture.

In some embodiments, a free end of the deflectable member is configured to deflect toward a longitudinal axis of the housing of the battery pack as the battery pack is inserted into the opening and to un-deflect into the aperture to allow the downwardly facing surface of the deflectable member to rest on the upwardly facing support surface of the umbrella hub.

In some embodiments, the power receptacle comprises a manual button is disposed laterally of the aperture on an outside surface of the body of the umbrella hub, the manual button being deflectable toward a central vertical axis of the opening to deflect the free end of the deflectable member out of contact with the upwardly facing support surface to allow the battery pack to be withdrawn from the opening.

In another embodiment, a battery pack is provided that includes a housing, a battery cell disposed in the housing, and a downwardly facing surface. The housing has a side profile configured to allow the battery pack to be inserted into a power receptacle such that an upper portion of the housing can be disposed in an opening of the power receptacle. The battery cell can be disposed in the housing and can be configured to supply or receive power through a contact disposed at an upper end of the battery pack. The downwardly facing surface is disposed on a lateral portion of the housing. The downwardly facing surface faces away from the upper portion of the housing. The downwardly facing surface is configured to rest on an upwardly facing support surface of an umbrella hub.

In some examples, the battery pack can include a radially inward facing side, a radially outward facing side and a radial projection projecting away from a radially outward facing surface on the radially outward facing side. The radial projection can be configured to be received in a notch of an umbrella hub power receptacle when the battery pack is fully inserted into the opening. The radial projection can project through a wall enclosing the power receptacle.

In some examples, the battery pack can be configured for magnetic attraction to an umbrella hub. A magnet or a magnetically attracting member can be disposed in the battery pack, e.g., adjacent to an upper surface thereof.

In some examples, the downwardly facing surface of the battery pack configured for supporting the pack in an umbrella hub can be disposed on a fixed shoulder of the housing.

In some examples, the battery pack can further comprise a deflectable member disposed on a lateral surface of the housing. The downwardly facing surface of the battery pack can be disposed on the deflectable member. A free end of the deflectable member can be configured to deflect toward a longitudinal vertical axis of the housing of the battery pack as the battery pack is inserted into a power receptacle of an umbrella hub. The free end of the deflectable member can be configured to un-deflect into an aperture formed in the umbrella hub to allow the downwardly facing surface of the deflectable member to rest on an upwardly facing support surface of the umbrella hub at the aperture.

An umbrella hub to which the battery pack is coupled can have a manual button disposed laterally the deflectable member, e.g., laterally of an aperture on an outside surface of the umbrella hub. The manual button can be deflectable toward a longitudinal axis of an opening into the power receptacle to deflect the free end of the deflectable member out of contact with an upwardly facing support surface to allow the battery pack to be withdrawn from the opening.

BRIEF DESCRIPTION OF THE DRAWINGS

Features of the invention can be better understood from the following detailed description when read in conjunction with the accompanying schematic drawings, which are for illustrative purposes only. The drawings include the following figures.

DETAILED DESCRIPTION

While the present description sets forth specific details of various embodiments, it will be appreciated that the description is illustrative only and should not be construed in any way as limiting. Furthermore, various applications of such embodiments and modifications thereto, which may occur to those who are skilled in the art, are also encompassed by the general concepts described herein. Each and every feature described herein, and each and every combination of two or more of such features, is included within the scope of the present invention provided that the features included in such a combination are not mutually inconsistent.

This application is directed to umbrella hub assemblies with a power receptacle configured to receive a battery pack or a battery pack assembly. The battery pack can be moved up and down with the hub if the hub is configured as a runner. The power receptacle can be provided in a stationary hub, such as an upper hub or upper nest as well. The battery pack assembly can supply or receive power from another device on or coupled with an umbrella into which the umbrella hub assembly is integrated.

Figure 1:
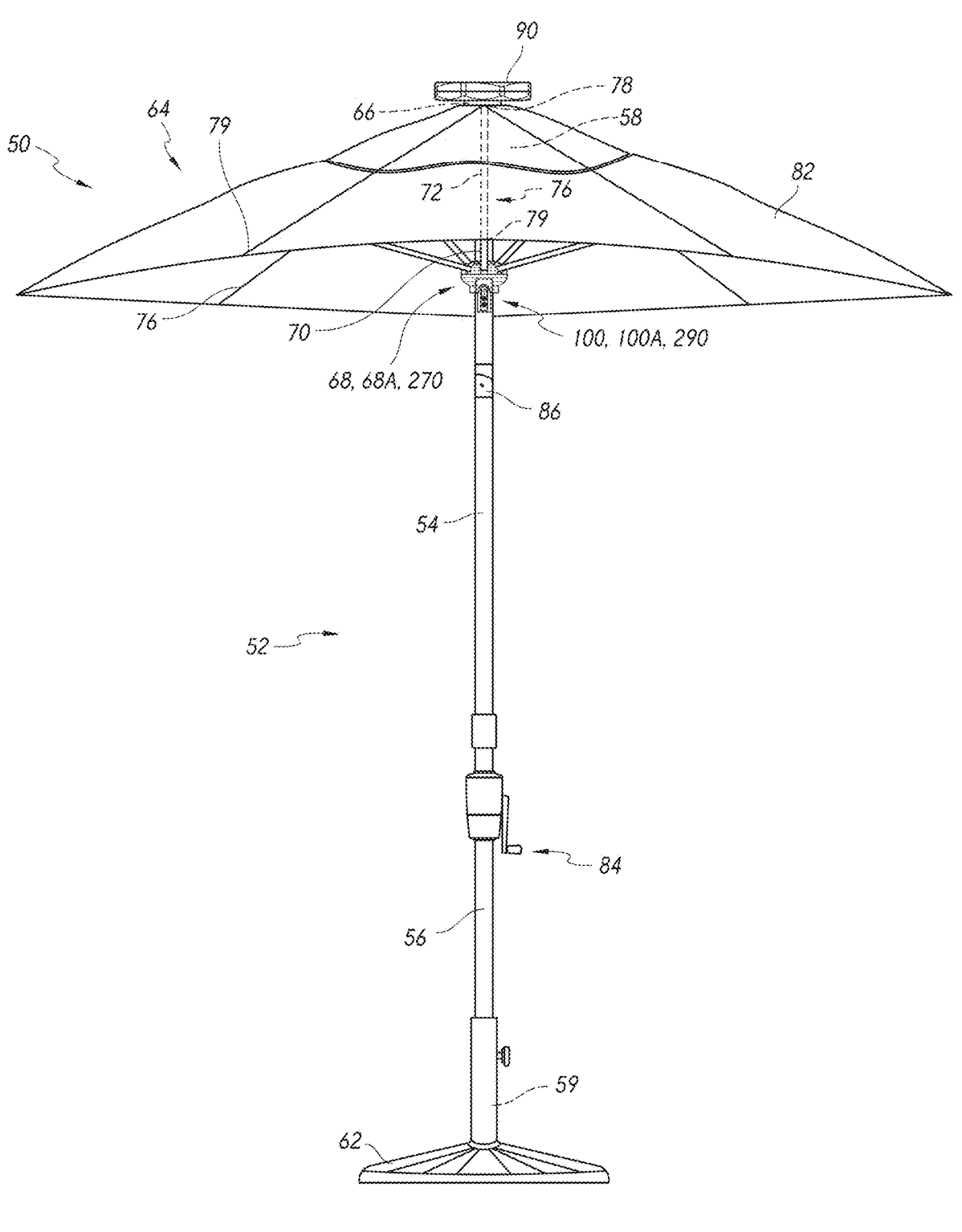
FIG. 1 is a side view of an umbrella assembly including a pole and an umbrella hub assembly coupled with a battery pack assembly.

FIG. 1 shows an umbrella assembly 50 that includes a pole or pole assembly 52 that can extend up to a central internal area of a shade assembly 64. Other embodiments can be provided where the shade assembly 64 is supported from a side position or a top position, e.g., in a cantilever or wall mounted umbrella configuration. The pole assembly 52 includes an upper pole portion 54 and a lower pole portion 56 which can be separate or separable from the upper pole portion 54. The pole assembly 52 can include a lower end 59 coupled with a base 62 and an upper end 58 coupled with an upper hub 66. The upper hub 66 can be fixed to (e.g., riveted or bolted to) the upper pole portion 54 at or adjacent to the upper end 58. The umbrella assembly 50 includes a lower hub 68 configured to slidably disposed on the pole assembly 52, e.g., moveable upward and downward along the umbrella assembly 50. The manner of movement of the lower hub 68 is not limiting, but in some cases by a crank assembly 84 provides for raising and lowering the lower hub 68. The lower hub 68 can be coupled to an array of struts 70. A first end 72 of each of the struts 70 is coupled with a middle portion of a corresponding rib 76 of a plurality of ribs 76 of the umbrella assembly 50. A second end 74 of each of the struts 70 is coupled with the lower hub 68 in a manner described below. Each of the ribs 76 includes a first end 78 coupled with the upper hub 66 and a second end 79 opposite the first end 78 disposed at a periphery of the shade assembly 64. The shade assembly 64 includes the combination of struts 70 and ribs 76 as well as a shade member 82 disposed over these umbrella structural members.

The crank assembly 84 can include or be coupled with a cord looped over a pulley and coupled with the lower hub 68. In some embodiments, the lower hub 68 can be raised to a first position in which the shade assembly 64 is fully open providing shade to area beneath the shade assembly 64. The umbrella assembly 50 can be configured such that continued cranking of the crank assembly 84 can further raise the lower hub 68 until a tilt assembly 86 of the umbrella assembly 50 is activated. The tilt assembly 86 can cause an articulated portion of the pole assembly 52 extending downward from the upper end 58 to pivot relative to a portion of the pole assembly 52 disposed beneath the articulated portion, e.g., the portion from the crank assembly 84 to the tilt assembly 86.

In some embodiments the umbrella assembly 50 is electrified, meaning that a source of electricity such as a solar panel 90 or a load is mounted to the umbrella assembly 50. In the illustrated embodiment the solar panel 90 is disposed at the top of the upper pole portion 54, e.g., coupled to the upper hub 66 which can be coupled with the upper end 58 of the pole assembly 52. The solar panel 90 can generate electricity when exposed to solar energy. Solar energy captured by the solar panel 90 can be directed to a battery pack 100A coupled with a hub, e.g., with the upper hub 66 or with the lower hub 68, as illustrated. Other battery pack configurations can be coupled with the lower hub 68, e.g., a battery pack 100 and a battery pack 290 examples of each discussed below.

Figure 2A:
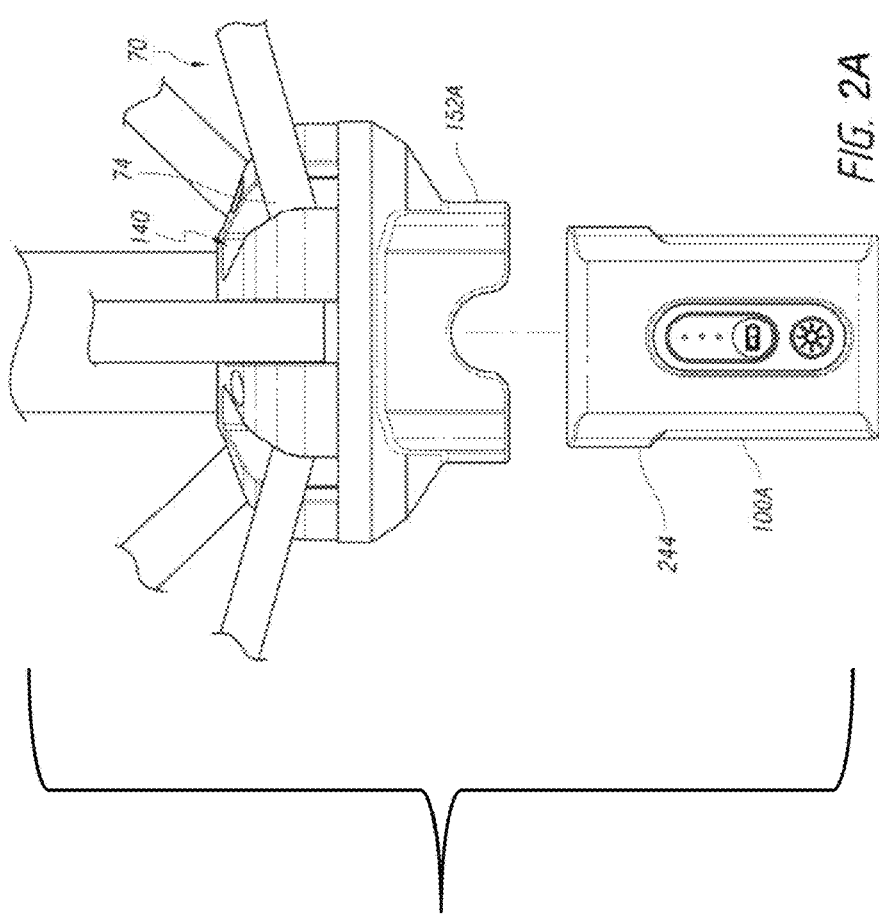
FIG. 2A-2E illustrate a method of coupling the battery pack assembly with the umbrella hub assembly of FIG. 1.
Figure 2:
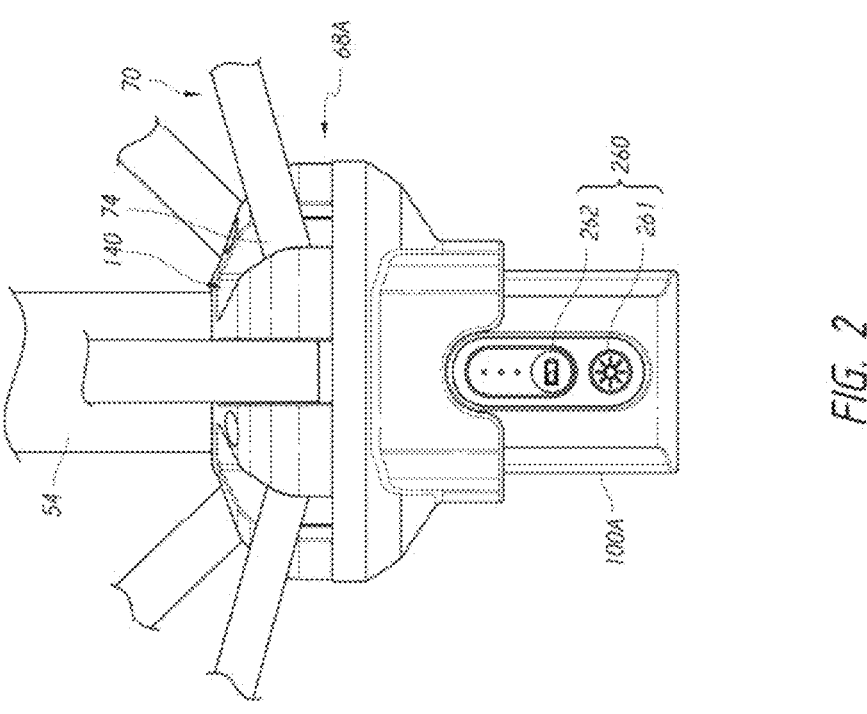
FIG. 2 is a detail front view of the umbrella hub assembly seen in FIG. 1.
Figure 2C:
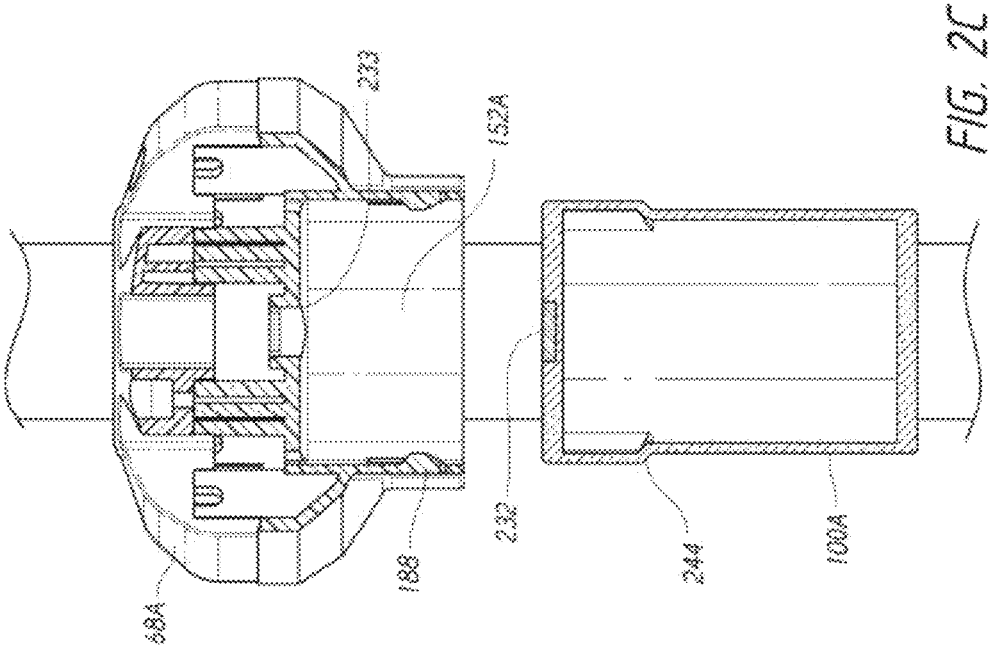
Figure 2B:
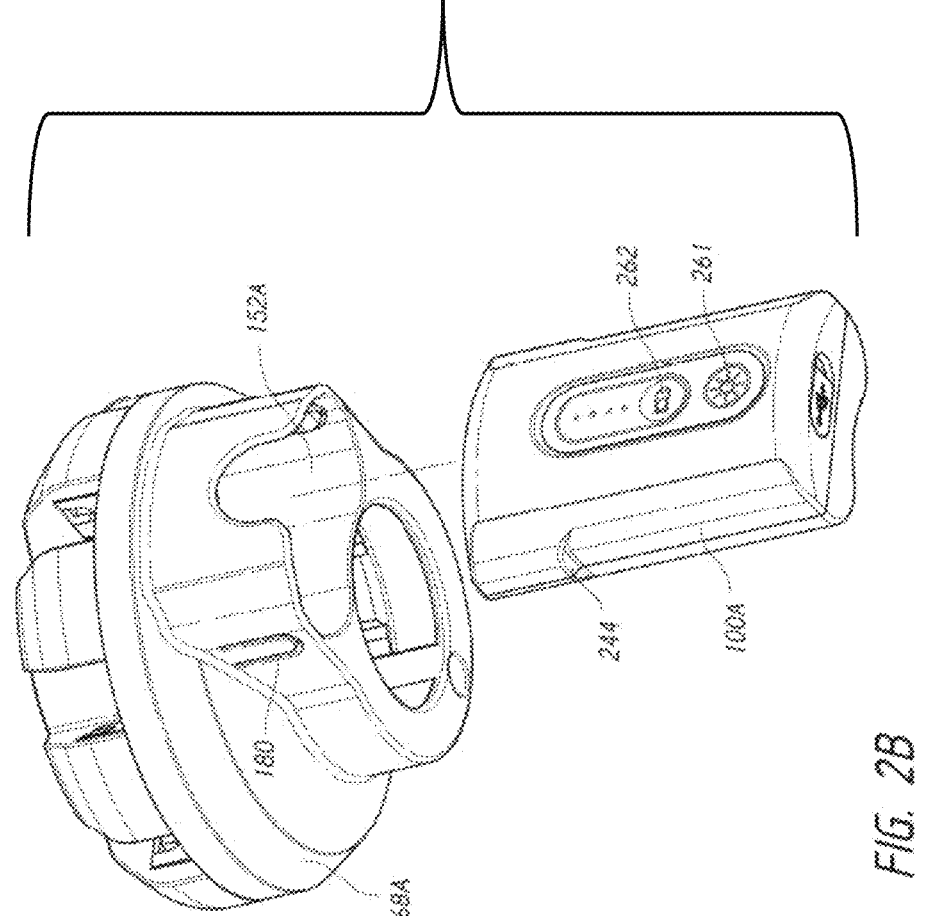
Figure 2E:
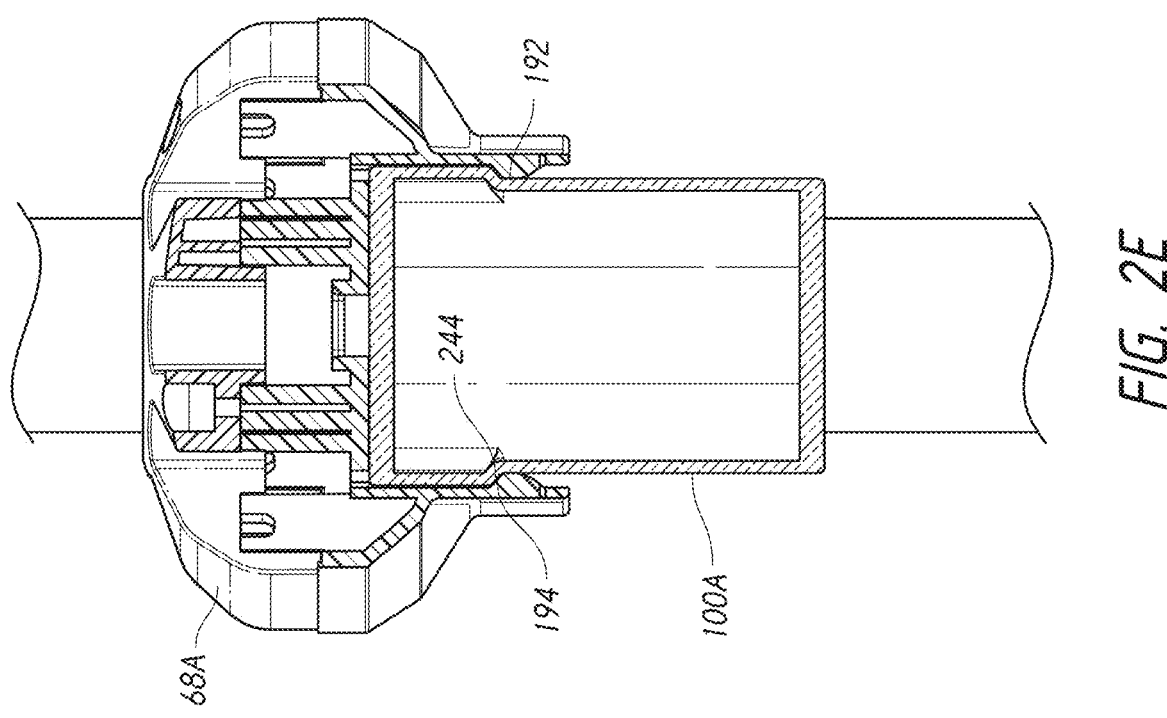

FIGS. 2 and 2A show one embodiment of the lower hub 68 and of the battery pack 100 that allows for temporary mounting of a battery pack with the umbrella assembly 50. The lower hub 68A includes a power receptacle 152 in which the battery pack 100A can be received. FIGS. 2B-2E show more details of how the battery pack 100A is received and retained in the power receptacle 152A. The description returns to these details below.

Figures 3, 3A:
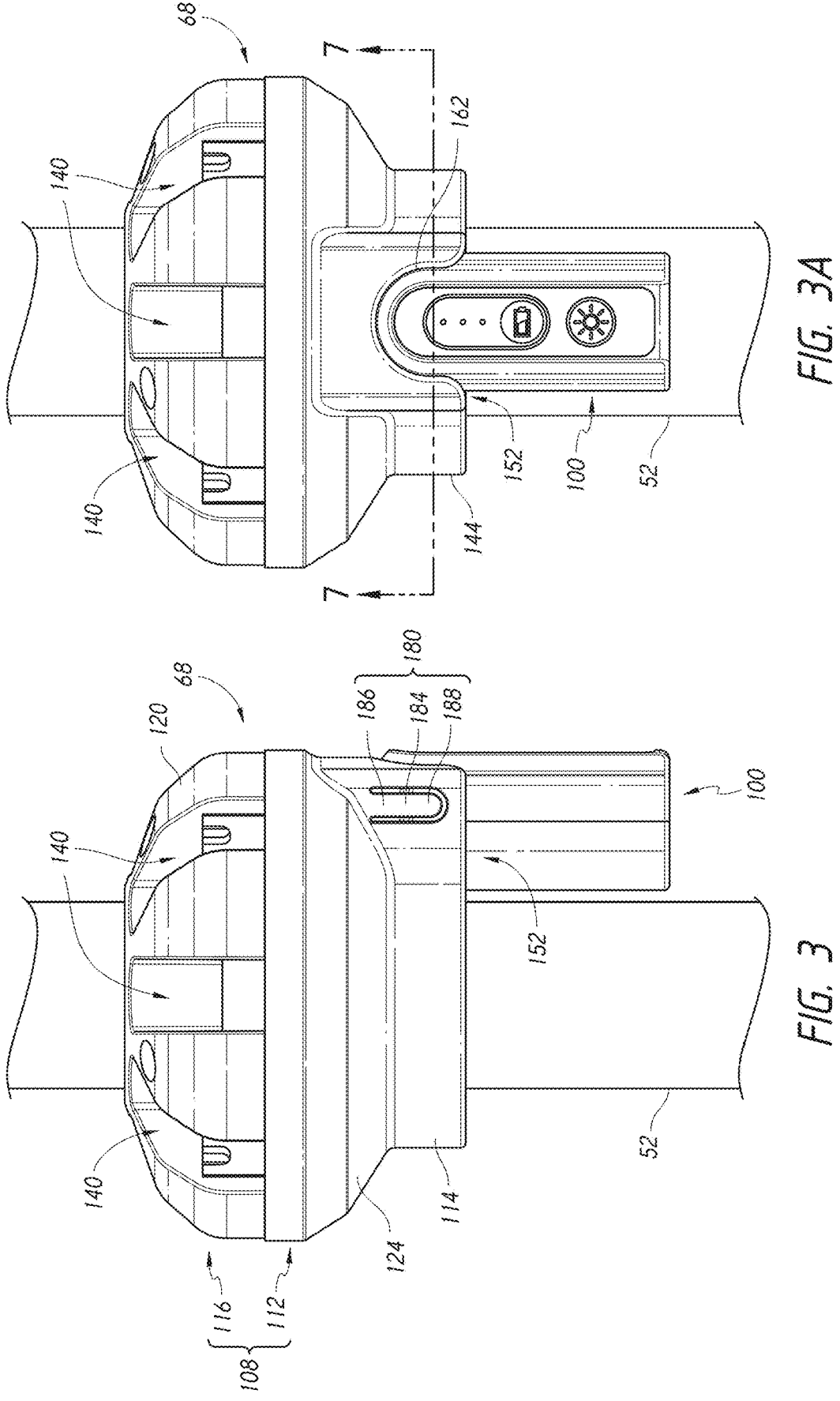
FIG. 3 is a side view of another umbrella assembly including an umbrella hub assembly that can be integrated into the umbrella assembly of FIG. 1.
FIG. 3A is a front view of the umbrella assembly of FIG. 3.
Figure 6:
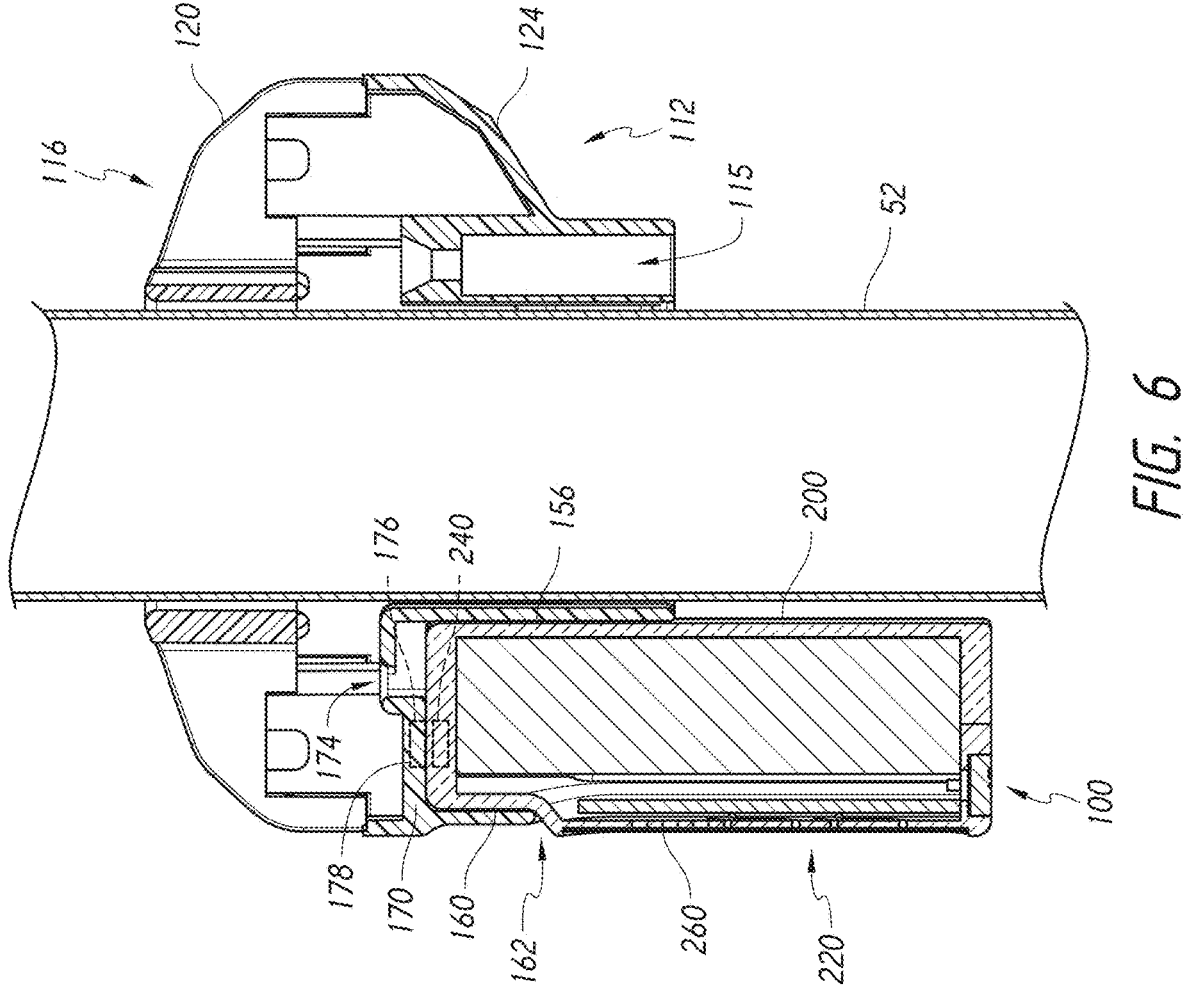
FIG. 6 is a cross-sectional view of the umbrella assembly of FIG. 3 taken at section plane 6-6 seen in FIG. 4.
Figure 7:
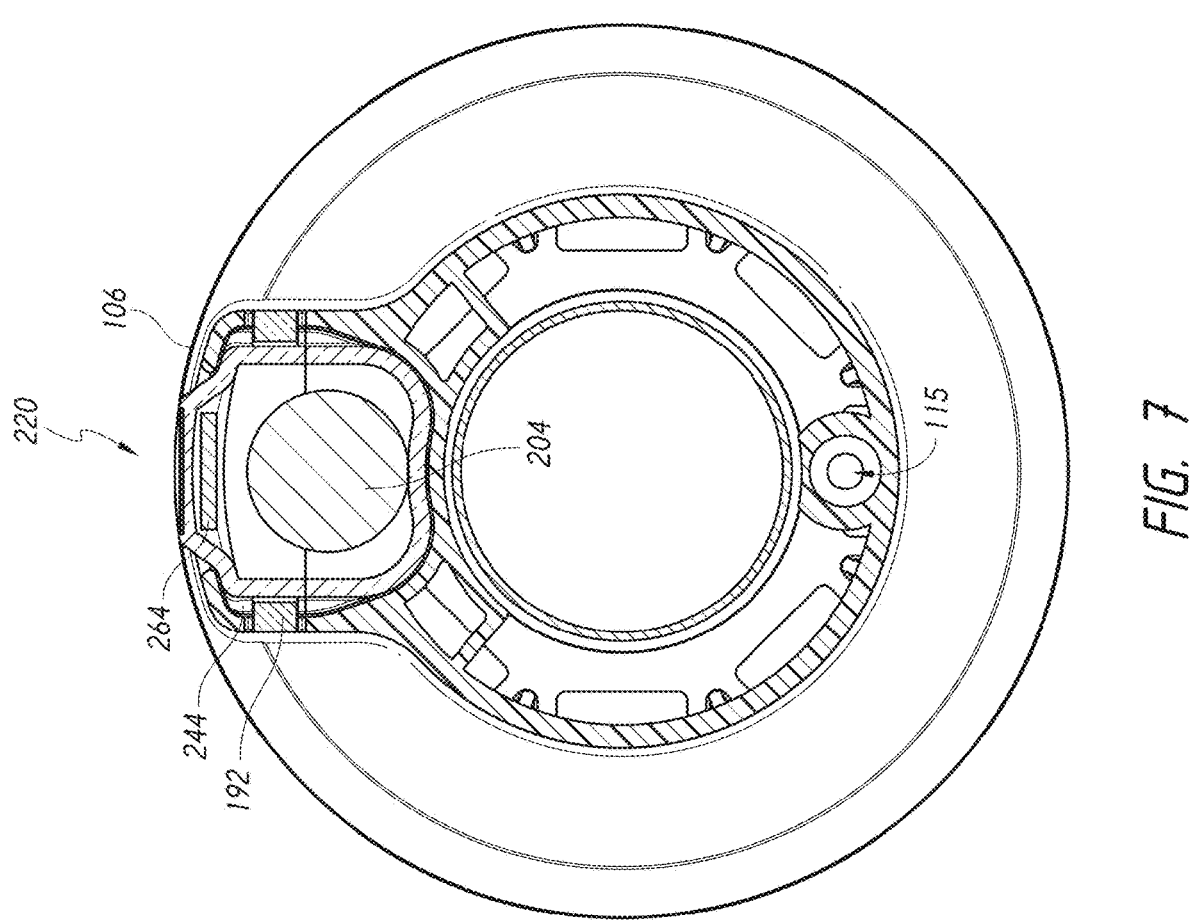
FIG. 7 is a cross-sectional view of the umbrella hub assembly of FIG. 3 taken at section plane 7-7 seen in FIG. 3A.
Figure 9:
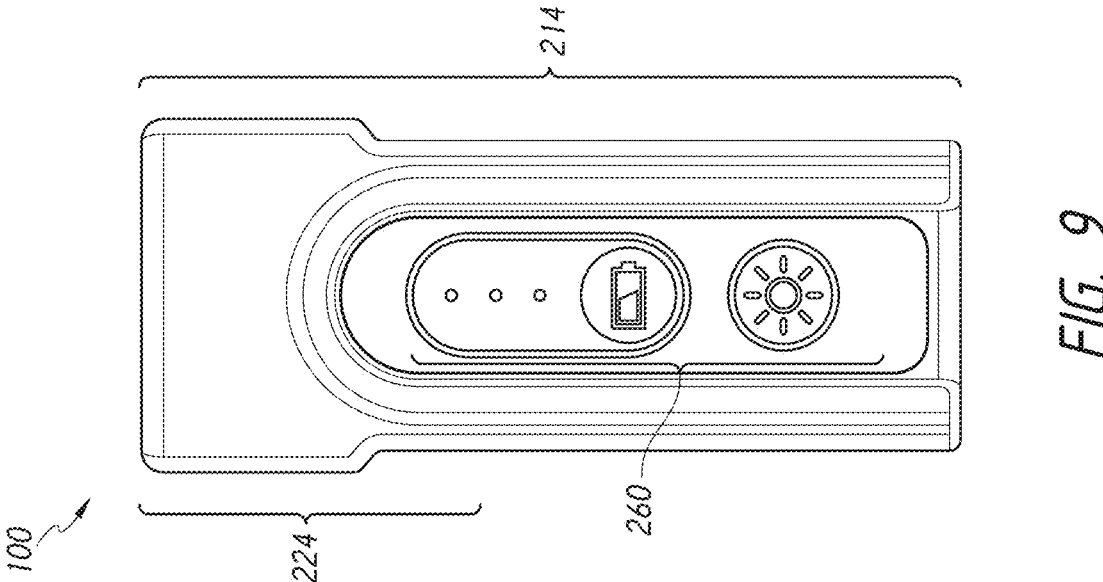
FIG. 9 is a front view of the battery pack assembly seen in FIG. 8.
Figure 8:
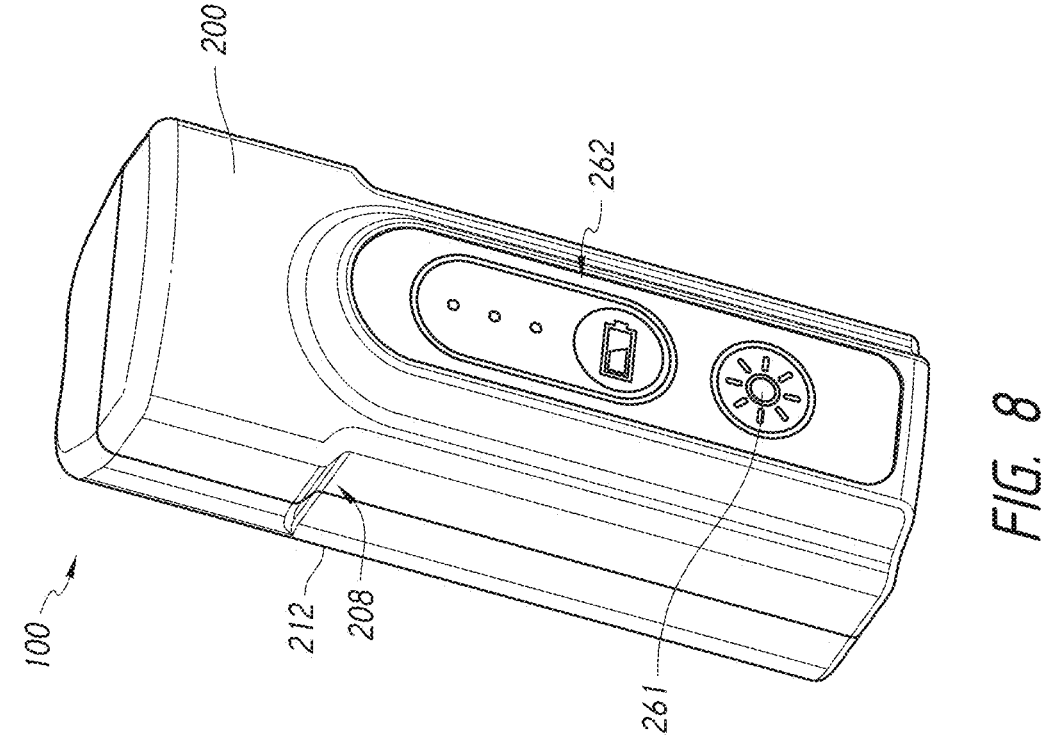
FIG. 8 is a top perspective view of a battery pack assembly of the umbrella hub assembly of FIG. 3.
Figure 11:
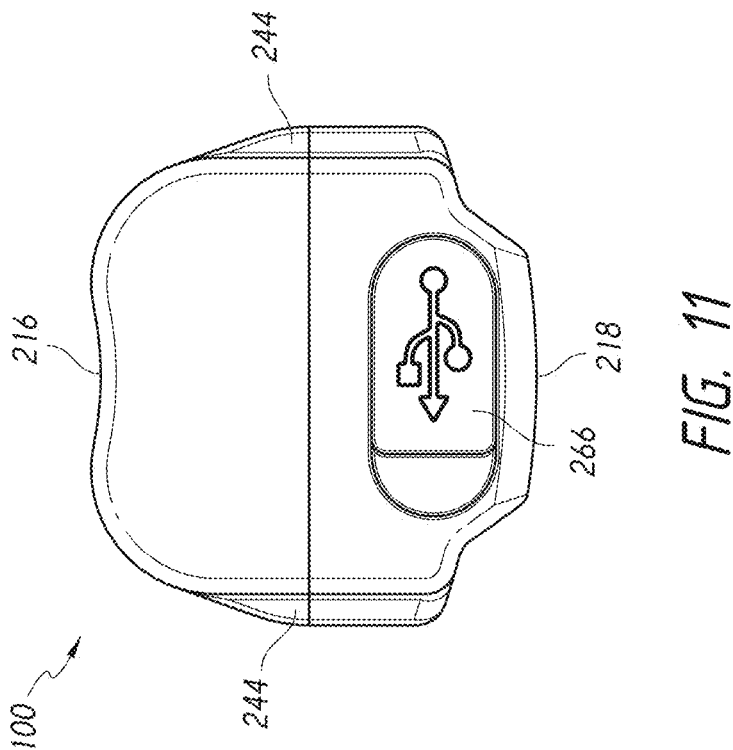
FIG. 11 is a bottom view of the battery pack assembly seen in FIG. 8.
Figure 10:
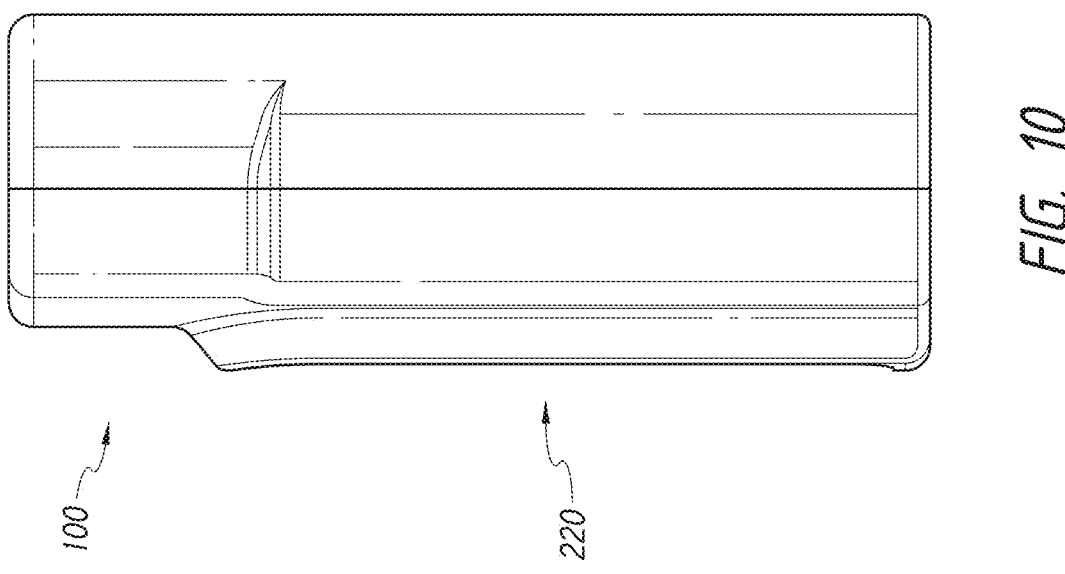
FIG. 10 is a side view of the battery pack assembly seen in FIG. 8.

FIG. 3 is a side view of a portion of a variant of the umbrella assembly 50 showing the lower hub 68 disposed along the pole assembly 52. The lower hub 68 includes a lower cover 112 and an upper cover 116 joined to the lower cover 112. When joined together at a cover fastener con- nection portion 115 (see FIGS. 4 and 6) the lower cover 112 and the upper cover 116 form a hub body 108. The hub body 108 can be a unitary structure without separate covers in some embodiments. The lower cover 112 extends over a lower surface 124 of the lower hub 68. The upper cover 116 includes an upper surface 120 of the umbrella assembly 50. The hub body 108 can extend along the upper surface 120 and the lower cover 112 of the lower hub 68. The lower cover 112 and the upper cover 116 can be separately molded and joined by one or more fasteners. The upper cover 116 includes a plurality of connection zones 140 that can be coupled with the second end 74 of the struts 70. The power receptacle 152 extends downwardly from the lower surface 124 of the lower cover 112. The power receptacle 152 is configured to releasably receive the battery pack 100. The power receptacle 152 can receive the battery pack 100 such that a battery cell 204 (as shown in FIG. 7) thereof is partially received into the opening of the power receptacle.

The power receptacle 152 can include one or more a deflectable tabs 180. The deflectable tab 180 can be disposed on a sidewall of the power receptacle 152. In embodiments, having two deflectable tabs 180, the deflectable tabs 180 can be positioned on opposite sidewalls of the power receptacle 152. The deflectable tab 180 can be configured as an elongate member that is fixed at one end and moveable at the other. The deflectable tab 180 can include a cantilever member 184 that extends from a fixed end 186 to a free end 188. The deflectable tab 180 can deflect to allow the battery pack 100 to be inserted into the opening of the power receptacle 152 and can deflect to allow the battery pack 100 to be withdrawn from the power receptacle 152. The power receptacle 152 includes a notch 162 configured to accommodate a portion of, e.g., a radial projection of, the battery pack 100, as discussed further below.

Figure 4:
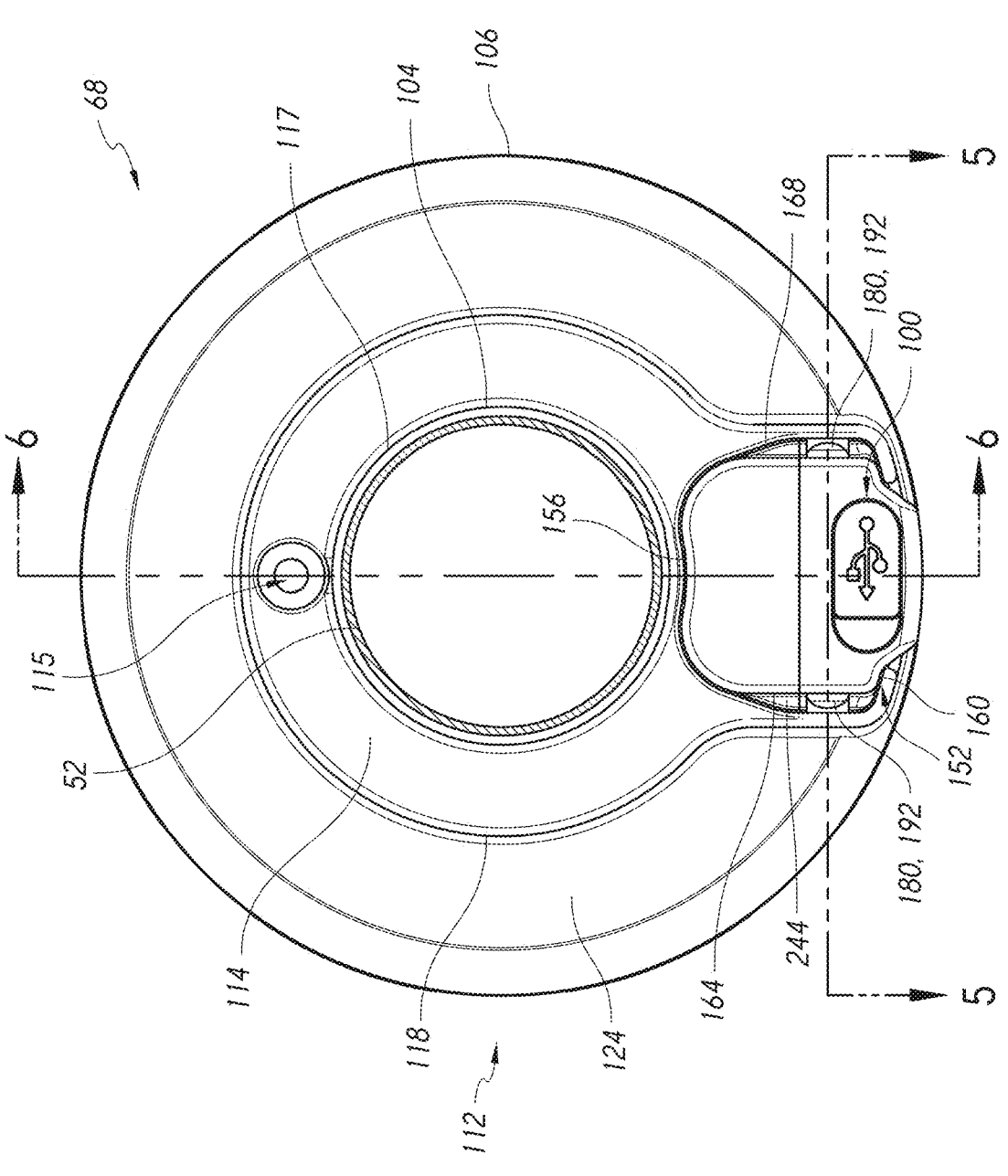
FIG. 4 is a bottom view of the umbrella hub assembly of FIG. 3.

FIG. 4 shows more details of the of the battery pack 100 from a bottom view. The lower hub 68 includes an inner periphery 104 and an outer periphery 106. The inner periphery 104 is configured to be disposed about an outer surface of the pole assembly 52. The inner periphery 104 can slide up and down along the pole assembly 52 between an elevation corresponding to an open configuration of the umbrella (as in FIG. 1) and an elevation corresponding to a closed configuration of the umbrella (with the shade assembly 64 disposed against or adjacent to the pole assembly 52). The power receptacle 152 can be disposed between the inner periphery 104 and the outer periphery 106 of the lower cover 112. The power receptacle 152 can extend away from the lower surface 124 of the lower cover 112. The power receptacle 152 can extend through the lower surface 124 into the lower cover 112. The power receptacle 152 can extend away from and through the lower surface 124 of the lower cover 112. The lower cover 112 includes an annular projection 114 disposed at the inner periphery 104. The annular projection 114 can be contiguous with the power receptacle 152 in one embodiment. The power receptacle 152 can extend into a portion of the annular projection 114. For example, the annular projection 114 can have a circular inner boundary 117 and a circular outer 118 boundary as viewed from the bottom. A radial thickness can be defined between the inner and outer circular boundaries 117, 118 of the annular projection 114. An inner portion of the power receptacle 152 can extend into the radial thickness. The inner portion can include an inner surface 156 disposed adjacent to the inner periphery 104 of the battery pack 100. The inner surface 156 can extend along a portion of the inner periphery 104 and can be a circumferential surface of the power receptacle 152. An outer portion of the power receptacle 152, e.g., an outer surface 160, can extend to the outer periphery 106 of the battery pack 100. The outer surface 160 can extend along a portion of the outer periphery 106 and can be a circumferential surface of the power receptacle 152. The inner surface 156 and the outer surface 160 can be circular in central circumferential portions thereof. The inner surface 156 can extend to a first end 164 or first end surface at one circumferential end of the inner surface 156. The inner surface 156 can extend to a second end 168 or second end surface at another circumferential end of the inner surface 156. The first end 164 and the second end 168 can extend partly through the annular projection 114 and partly between the annular projection 114 and the outer periphery 106 of the lower hub 68. The overall shape of the walls of the power receptacle 152 defined by the inner surface 156, outer surface 160, first end 164, and second end 168 correspond to a side profile 214 of a housing 200 of the battery pack 100.

Figure 5:
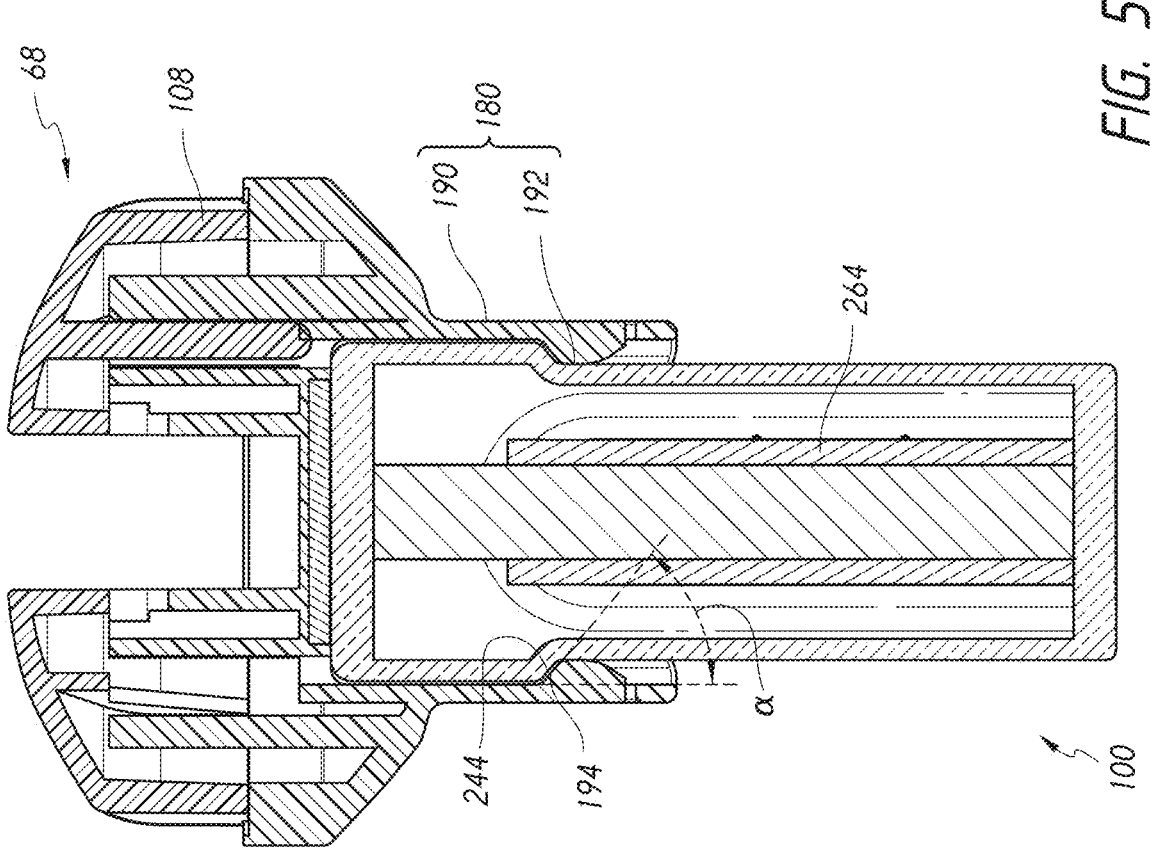
FIG. 5 is a cross-sectional view of the umbrella hub assembly of FIG. 3 taken at section plane 5-5 seen in FIG. 4.

The power receptacle 152 can include one or more deflectable tabs 180, as discussed above. The deflectable tab 180 has an inward projection 192 that extends into the power receptacle 152 from a side wall disposed about the power receptacle 152. The inward projection 192 can extend inwardly from a portion of the first end 164, e.g., adjacent to the outer surface 163B. The inward projection 192 can extend inwardly from a portion of the second end 168, e.g., adjacent to the outer surface 163B. The inward projection 192 can be located on the first end 164 and on the second end 168. Although two inward projections 192 are shown, in other embodiments one or more than two inward projection 192 can be provided. The inward projection 192 could be disposed on the wall surrounding the power receptacle 152 such that the projection extends inward relative to the outer surface 163B. FIG. 4 shows that the inward projection 192 can be disposed under a downward or downwardly facing support surface 244 of the housing 200. As discussed further in connection with FIGS. 8-12, the downwardly facing support surface 244 can be disposed on a fixed shoulder. FIGS. 4 and 5 show that the downwardly facing support surface 244 is configured to rest on an upwardly facing support surface 194 of the lower hub 68, e.g., of the inward projection 192. In various embodiments, an internal angle α of 60 degrees or less (e.g., about 60 degrees, about 50 degrees, about 45 degrees, about 35 degrees, about 30 degrees or a range bounded by any of the foregoing angles) can be formed between the upwardly facing support surface 194 and a vertical axis or plane.

In some embodiments, the inward projection 192 is sufficient to support the weight of the battery pack 100 in the power receptacle 152 and provides sufficient connection therebetween such that normal use (e.g., the umbrella assembly 50 at rest in an open or closed state, opening and closing of the umbrella assembly 50) does not dislodge the battery pack 100. FIG. 6 shows that in some embodiments, another form of connection between the battery pack 100 and the lower hub 68 can be provided. A recess 178 can be provided in a top wall or top surface 170 of the power receptacle 152. A magnetic member 176 can be disposed in the recess 178. The magnetic member 176 also could be molded into a wall of the lower cover 112. The magnetic member 176 can be fully encapsulated in the wall of the lower cover 112 or could be exposed at the top surface of the power receptacle 152. The magnetic member 176 can magnetically couple with a magnetic member 240 disposed in or on the battery pack 100. The magnetic member 240 can be molded into the housing 200 of the battery pack 100, e.g., fully encapsulated in the housing 200 or can be exposed at an upper surface of the housing 200 of the battery pack 100.

FIG. 6 shows that the housing 200 and the power receptacle 152 can be configured to provide a slip fit. For example, an inwardly facing side of the housing 200 can be disposed immediately adjacent to the inner surface 156 and an outwardly facing side of the housing 200 can be disposed immediately adjacent to the outer surface 160 of the power receptacle 152. The fit of the housing 200 within the power receptacle 152 can prevent radial movement of the battery pack 100 within the power receptacle 152 so that the battery pack 100 is not easily tilted within the power receptacle 152 which could cause the magnetic attraction of the magnetic member 176 and the magnetic member 240 from being disturbed.

FIGS. 6 and 7 show that a radial projection 220 of the battery pack 100 can extend through the notch 162 of the power receptacle 152 when the battery pack 100 is fully inserted into the receptacle. The radial projection 220 can be configured to extend to a radial position that is at or in some embodiments radially outward of an outer ward facing surface of a wall having the outer surface 160 formed thereon. FIG. 7 shows that the radial projection 220 can extend to the outer periphery 106 of the lower hub 68 in some embodiments. By extending the radial projection 220 to the outer periphery 106 a user interface 260 formed thereon can be accessible to a user and access to control devices on the user interface 260 will not be blocked or impeded by the structure of the lower hub 68. For example, the walls containing the power receptacle 152, e.g., the wall disposed outward of and along the outer surface 160 will not protrude radially outward of the user interface 260 to potentially block access to user interface devices disposed thereon. Interaction of a top surface of, e.g., an arched surface of, the radial projection 220 with the notch 162 provides confirmation that the battery pack 100 has been fully inserted into the power receptacle 152. When fully inserted, at least a portion of the user interface 260 is disposed within the notch 162, e.g., above a bottom edge of the power receptacle 152. See, e.g., FIG. 3A. The top (e.g., arched) surface can be disposed against or adjacent to the notch 162 as the magnetic member 176 and the magnetic member 240 magnetically engage each other. The matched profiles of the top of the radial projection 220 and the notch 162 also limit tipping or other loose fitting connection between the battery pack 100 and the power receptacle 152 so that the battery pack 100 is securely connected to the lower hub 68 when in the receptacle.

Some embodiments benefit from multiple connection configuration by way of the interaction of the inward projection 192 with the downwardly facing support surface 244 and by way of magnetic attraction between the magnetic member 176 with the magnetic member 240. Some embodiments benefit from sufficient connection by way of the interaction of the inward projection 192 with the downwardly facing support surface 244 and a magnetic connection is omitted. Some embodiments benefit from sufficient connection by way of the magnetic attraction between the magnetic member 176 and the magnetic member 240 and connection by way of the interaction of the inward projection 192 with the downwardly facing support surface 244 is omitted.

FIGS. 8-12 show the battery pack 100 in greater detail. The battery pack 100 includes a housing 200 that encloses at least one battery cell 204 (see FIG. 7). The housing 200 includes the engagement feature 208 disposed on a side surface 212, e.g., on a lateral portion. The housing 200 can include a radially inward facing side 216 and a radially outward facing side 218. The radially inward facing side 216 can have a curvature matching that of the inner surface 156 of the power receptacle 152 and/or that of the pole assembly 52. Matching the inner surface 156 can facilitate a secure slip-fit connection of the battery pack 100 with the power receptacle 152. The radially outward facing side 218 can have a curvature matching, e.g., the same as, the outer periphery 106 of the lower hub 68. Matching the outer periphery 106 allows the size of the housing 200 to be enlarged while still being disposed under the lower cover 112. This can enable the housing 200 to enclose larger or more battery cells 204.

The side surface 212 includes or forms a side profile 214 that facilitates engagement of the housing 200 with the power receptacle 152. The side surface 212 or lateral portion can include an upper portion 224, which can comprise a length of the housing configured to be inserted into the power receptacle 152. A lower length of the upper portion 224 can have a narrow width and an upper length of the upper portion 224 can have an enhanced width. The engagement feature 208 can include the downwardly facing support surface 244 discussed above. The downwardly facing support surface 244 can include a fixed shoulder disposed between the enhanced width upper length and the lower length. The downwardly facing support surface 244 can be configured to rest on the upwardly facing support surface 194 of the inward projection 192 of the deflectable tab 180. In various embodiments, an external angle α between the downwardly facing support surface 244 and a vertical plane or axis can be about 60 degrees or less (e.g., about 60 degrees, about 50 degrees, about 45 degrees, about 35 degrees, about 30 degrees or a range bounded by any of the foregoing angles). The upper portion 224 can correspond to a length of the housing that can be inserted into the power receptacle 152 when the inward projection 192 is disposed beneath the downwardly facing support surface 244 while the downwardly facing surface rests on the upwardly facing support surface of the umbrella hub.

Figure 12:
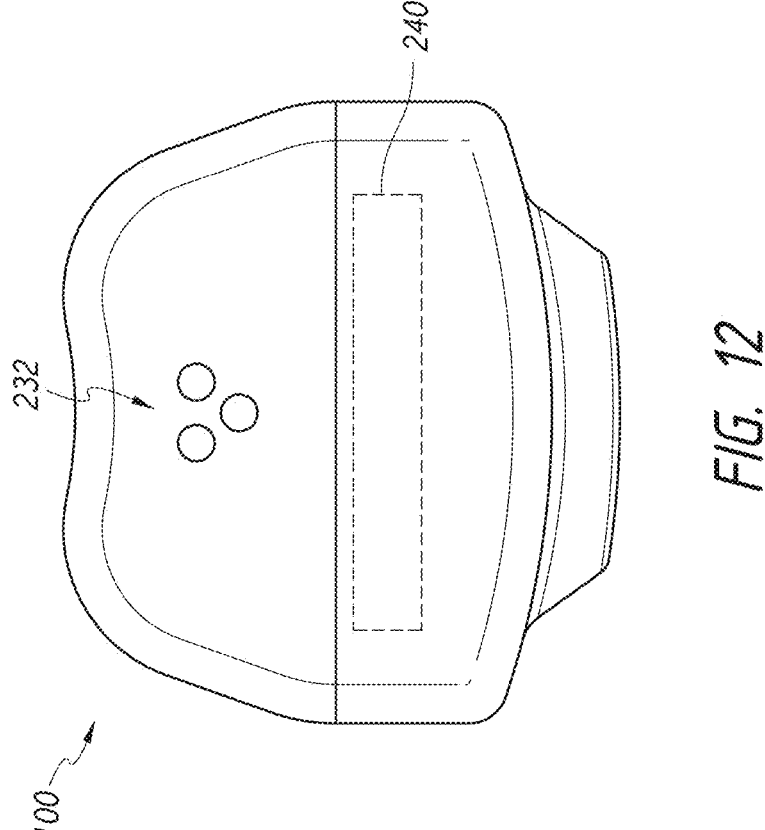
FIG. 12 is a top view of the battery pack assembly seen in FIG. 8.

In some cases the lower hub 68 and the power receptacle 152 are configured to receive and retain the battery pack 100 without providing any electrical connection therebetween. In other embodiments, the battery pack 100 is configured to be electrically connected to a power source, e.g., to the solar panel 90, or to a load on the umbrella assembly 50. FIG. 12 shows that the housing 200 can have contact 232 disposed at an upper end of the battery pack 100. The contact 232 can include a three core plug socket, e.g., three small openings to receive the plug components of a three core plug. Electrical connection to the power receptacle 152 can be facilitated by disposing a three core plug 233 on the top surface 170 of the receptacle. The three core plug 233 can be mounted in or to a component mounted in a mounting aperture 174 of the top surface 170. Where connection to a load or to the solar panel 90 is needed, a wire can be routed through the connection zone 140 immediately above the power receptacle 152 (see FIG. 3A) into the strut 70 coupled with the lower hub 68 at that connection zone 140. The wire can then be routed through a connection between that strut 70 and a rib 76 to another location of the umbrella, e.g., to the upper hub 66, to the solar panel 90 or to a load disposed on the umbrella. The wire can connect the battery pack 100 to the solar panel 90 or to another load, e.g., to lights disposed along any of the struts 70 and the ribs 76 or to a top or bottom surface or side of the shade member 82. Electrical connection could also be made to other components mounted along the pole assembly 52, e.g., to electric motors for raising or lower the lower hub 68 or operating the crank assembly 84 or to other load such as electronics for computing, playing music or accessing a local network or the Internet.

The housing 200 can enclose a processor 264 to control the flow of electricity into or out of the battery cell 204. The processor 264 can be located in the radial projection 220 disposed on the radially outward facing side 218. The processor 264 can be disposed between the user interface 260 and the battery cell 204. The processor 264 can be disposed on a circuit board disposed between the battery cell 204 and the outside of the housing 200. The user interface 260 can include a number of different devices for inputs and outputs. For example, a power button 261 can be provided for turning the battery pack 100 on and off. The power button 261 can allow current stored in the battery cell 204 to be delivered to a load on the umbrella assembly 50, for example. The power button 261 can allow current to be delivered to the battery cell 204 to be stored, as another example. In one embodiment, the power button 261 is indicated by a sun icon disposed at the bottom of the user interface 260. The user interface 260 can also include a visual display 262 for outputting messages to the user. The display 262 can include a status bar indicative of the amount of charge stored in the battery cell 204, e.g., the percentage of charge capacity that is charged at any specific moment. The display 262 can also include one or more lights, e.g., a vertical array of three lights, which can indicate that the battery pack 100 is powered on and operational or whether current is being drawn from or delivered to the battery pack 100 as non-limiting examples. The battery pack 100 also can have an ac charge port 266. The ac charge port 266 can be configured to enable the battery pack 100 to be charged by plugging into an alternating current power source, e.g., to wall power in a residence of business. The ac charge port 266 can be configured to connect to other battery operated devices to charge such devices through the port 266.

Returning to FIGS. 2-2E, the connection of a battery pack 100A to a lower hub 68A. The battery pack 100A is similar to the battery pack 100. The lower hub 68A is similar to the lower hub 68. Common features of these two embodiments of battery packs and two embodiments of lower hubs will not be redescribed. The descriptions set forth elsewhere herein are incorporated into the description of the lower hub 68A and of the battery pack 100A. Also, the description of the insertion of the battery pack 100A into a power receptacle 152A of the lower hub 68A is similar to the insertion of the battery pack 100 into the power receptacle 152 of the lower hub 68. The description of the insertion of the battery pack 100A is applicable to and incorporated into the discretion of insertion of the battery pack 100 into the lower hub 68.

The battery pack 100A can have a wider profile than the battery pack 100. For example, a ratio of the circumferential dimension (along the radially outward facing side 218) to a radial dimension (between the radially inward facing side 216 and the radially outward facing side 218) at the bottom of the housing of the battery pack 100A can be greater than 1, e.g., 1.2, 1.5, 1.8, or 2.0. The housing 200 of the battery pack 100A can have a curvature following the outer periphery 106 of the battery pack 100A. A central portion of the radially outward facing side of the housing 200 can be disposed at within or radially inward of the curvature of the rest of the radially outward facing side. The user interface 260 can be recessed into the curvature of the radially outward facing side of the housing of the battery pack 100A.

Figure 2D:
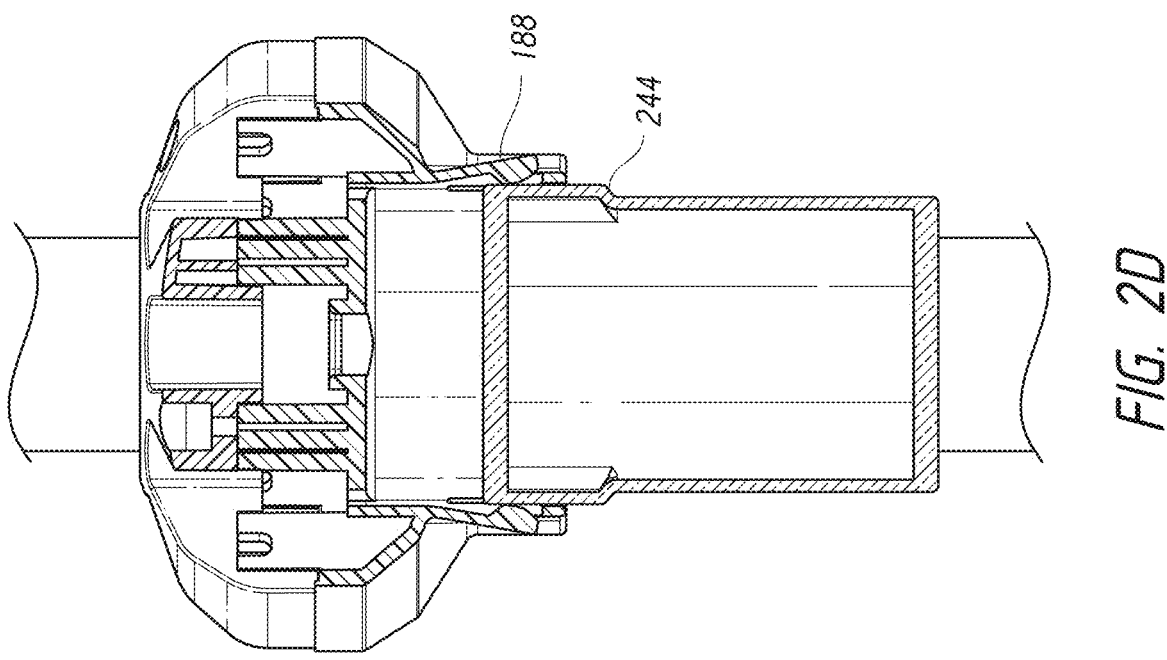

In one method, the battery pack 100A is disposed adjacent to but just below the lower hub 68A, e.g., immediately below the power receptacle 152A. The housing of the battery pack 100A can be oriented such that the support surface 244 faces downwardly, as in FIG. 2A-2C. FIG. 2D shows the housing of the battery pack 100A being inserted into the opening of the power receptacle 152A from the position seen in FIG. 2A-2C. The upper portion 224 (from the top of the housing toward the downwardly facing support surface 244) is initially inserted into the opening of the power receptacle 152A. As the downwardly facing support surface 244 reaches the free end 188 of the deflectable tab 180 the tab is deflected away from a longitudinal vertical axis of the battery pack 100A. Continued advancement of the battery pack 100A into the power receptacle 152A can dispose the downwardly facing support surface 244 above the inward projection 192 of the deflectable tab 180. The downwardly facing support surface 244 can be advanced past the inward projection 192 such that the deflectable tab 180 can deflected back toward the longitudinal vertical axis of the battery pack 100A. In this position the downwardly facing surface 244 rests on the upwardly facing support surface of the inward projection 192. Although the method of using the battery pack 100A with the lower hub 68A has been described, the battery pack 100 is inserted into and coupled with the lower hub 68 in a similar manner.

Figure 14A:
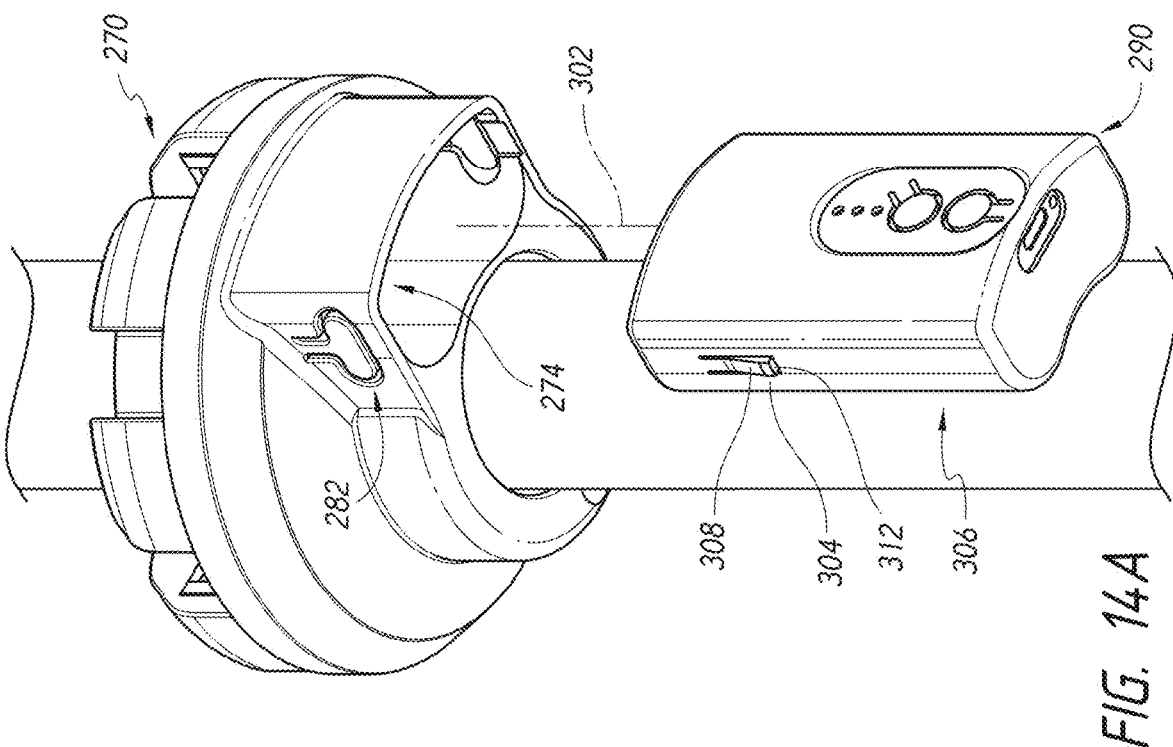
FIG. 14A-14D illustrate a method of coupling the battery pack assembly with the umbrella hub assembly of FIG. 13.
Figure 13:
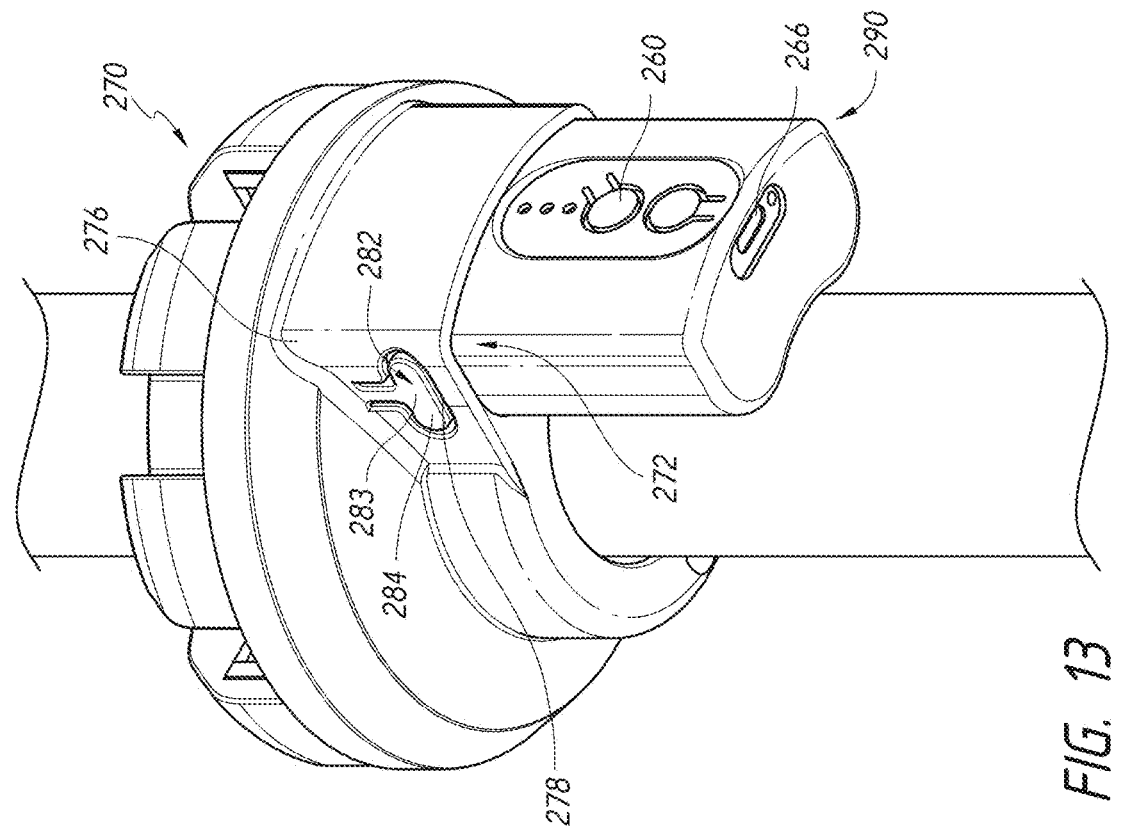
FIG. 13 is a bottom perspective view of another embodiment of an umbrella assembly including an umbrella hub assembly coupled with another embodiment of a battery pack assembly.
Figure 14C:
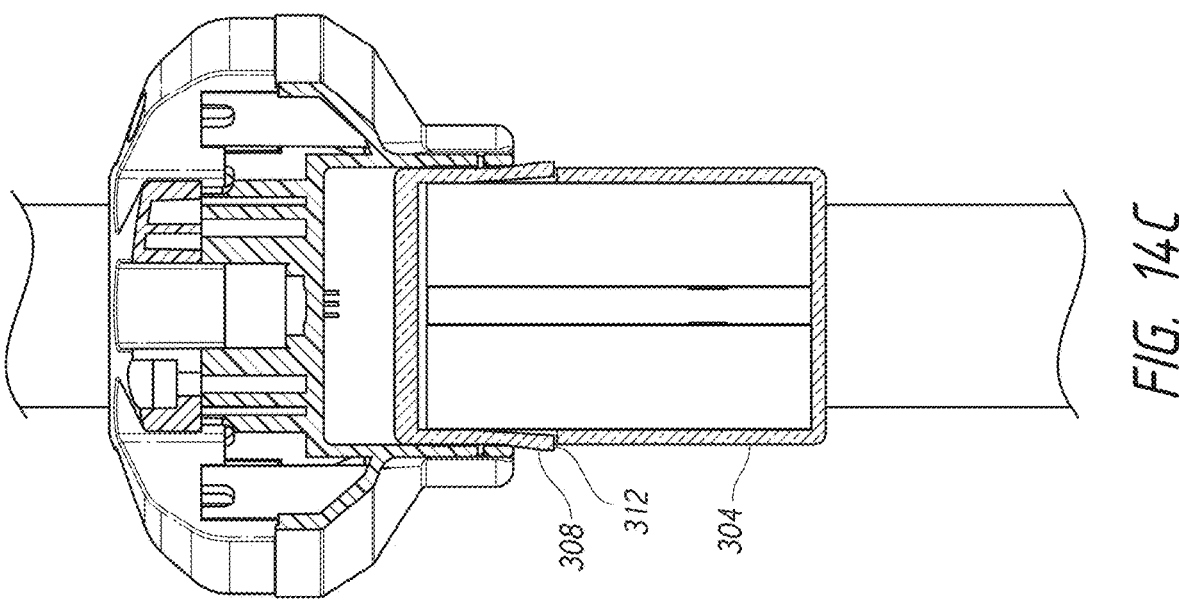
Figure 14B:
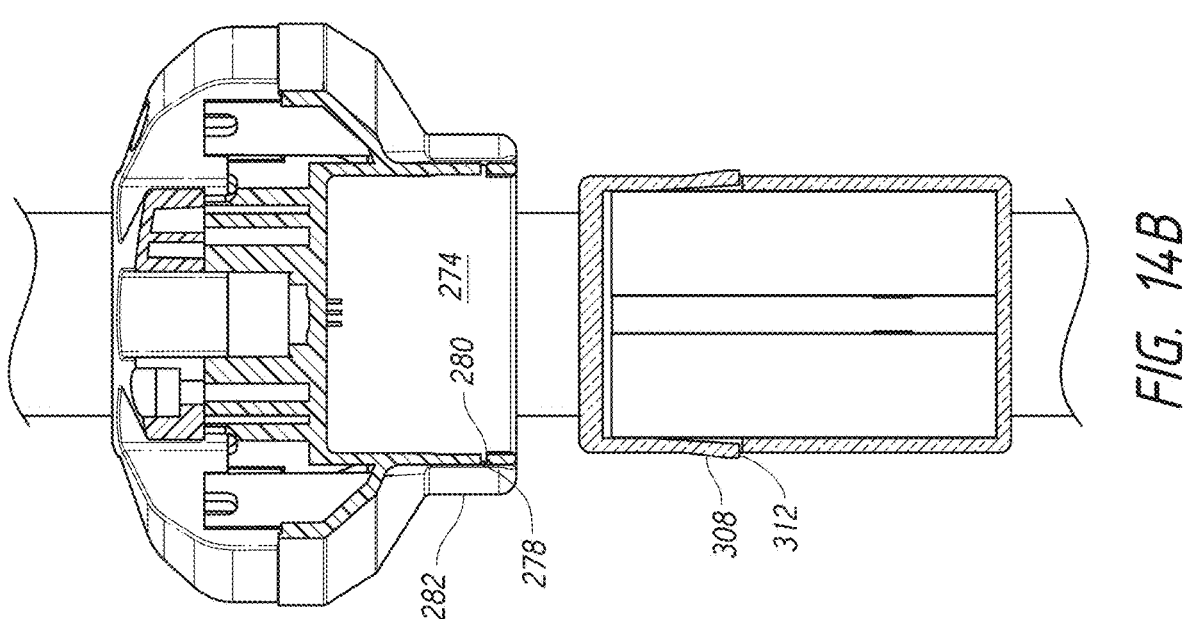
Figure 14D:
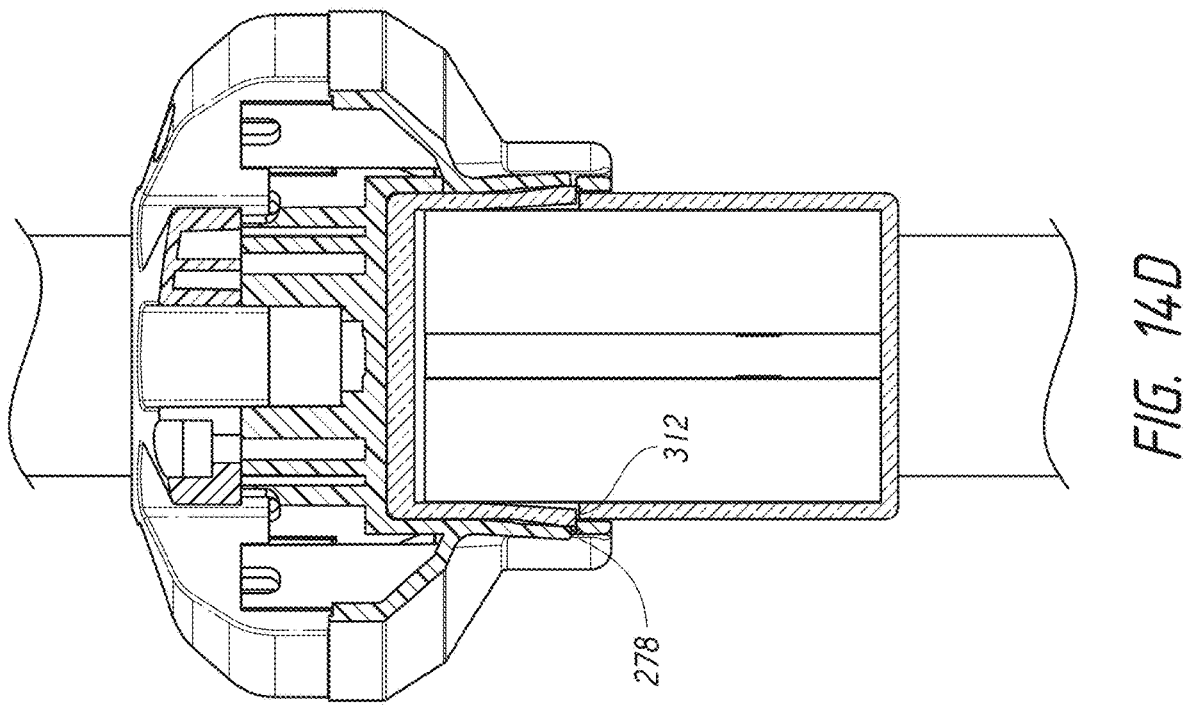

FIG. 13-14D illustrates another embodiment of a lower hub 270 and a battery pack 290 usable therewith. The lower hub 270 has a power receptacle 272 configured to receive the battery pack 290. The power receptacle 272 can have an opening 274 into which the battery pack 290 can be inserted. The power receptacle 272 can be similar to the power receptacle 152 or the power receptacle 152A except as described otherwise below. The power receptacle 272 can include a notch as describe above in connection with the power receptacle 152 or can have a periphery that is without a notch, e.g., having a same height as measured from a lower surface 124 to a lower edge of the opening 274 along the outer surface thereof. A central longitudinal axis 302 of the opening 274 can be aligned with a longitudinal vertical axis of the battery pack 290. A lateral wall 276 of the body of the lower hub 270 can have an aperture 278 having edges. A manual button 282 can be disposed laterally of the aperture 278 on an outside surface of the body of the lower hub 270. The manual button 282 can be deflectable toward the longitudinal axis 302 or the longitudinal vertical axis of the battery pack 290 to deflect the free end of the deflectable member of the battery pack 290 out of contact with and out of a supporting position over an upwardly facing support surface of the lower hub 270 to allow the battery pack to be withdrawn from the opening.

FIGS. 14A-14C shows these features and methods in more detail. The battery pack 290 can be positioned beneath the opening 274 with the longitudinal vertical axis of the battery pack 290 aligned with the longitudinal axis 302 of the opening 274. The battery pack 290 can include a lateral surface 304 on a lateral wall 306 disposed between circumferential sides of the battery pack 290. A deflectable member 308 can be disposed on the lateral wall 306. The deflectable member 308 can have a free end 312 that, in a free state, protrudes laterally (or in the environment of the lower hub 68, circumferentially) away from the lateral wall 306. As the battery pack 290 is inserted into the opening 274 the deflectable member 308 can be deflected toward the longitudinal axis 302 of the battery pack 290. As the battery pack 290 is further inserted the deflectable member 308 can be positioned at or within the aperture 278 and when so positioned the free end 312 can un-deflect away from the longitudinal vertical axis of the battery pack 290 until the free end 312 is over the top of an upwardly facing surface 280 of the aperture 278. The free end 312 can rest on top of or atop the upwardly facing surface 280 of the aperture 278 when fully inserted as in FIG. 14D.

The battery pack 290 can be removed by pressing on the manual button 282. The manual button 282 can be pressed inward toward the longitudinal vertical axis of the battery pack 290 to deflect the deflectable member 308 toward the longitudinal axis. Manual pressing on the manual button 282 can move the free end 312 toward the longitudinal vertical axis and/or toward the longitudinal axis 302 of the power receptacle 272 and off of the upwardly facing surface 280. In one case, the manual button 282 can be in the form of a cantilever member 283. The cantilever member 283 can have an outside surface 284 that is exposed on the outside of the lower hub 270 and can be grasped by a user. The cantilever member 283 can have an inside surface that can abut an outward facing surface of the deflectable member 308 of the battery pack 290. Pressing on the outside surface of the manual button 282 can cause the inside surface to apply a load directly to the outward facing surface of the deflectable member 308 to move the deflectable member. When the free end 312 is moved off the upwardly facing surface 280 the capability of the deflectable member 308 to retain the battery pack 290 in the lower hub 270 is eliminated. Thereafter the battery pack 290 can be removed by pulling the battery pack 290 downward. If a magnetic support function is built into the connection of the battery pack 290 to the lower hub 270, pulling on the battery pack 290 can be by a hand force sufficient to overcome the magnetic attraction.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a sub combination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. An umbrella hub assembly, comprising:
an inner periphery configured to be disposed about an umbrella pole;
an outer periphery disposed outward of the inner periphery;
a hub body extending from the inner periphery to the outer periphery, the hub body extending between a top portion and a bottom portion of the umbrella hub assembly;
an array of strut connection zones disposed in the hub body at or adjacent to the outer periphery;
a power receptacle projecting from the bottom portion of the hub body, the power receptacle disposed between a first circumferential surface disposed adjacent to the inner periphery, a second circumferential surface disposed adjacent to the outer periphery, a first end surface extending between the first circumferential surface and the second circumferential surface, and a second end surface extending between the first circumferential surface and the second circumferential surface opposite the first end surface;
an upwardly facing support surface disposed on one of the first end surface and the second end surface; and
a battery pack comprising:
a housing comprising a side profile configured to allow the battery pack to be inserted into the power receptacle such that an upper end portion of the housing can be disposed in the power receptacle;
a battery cell disposed in the housing configured to supply or receive power through a contact disposed at an upper end of the battery pack; and
a downward facing surface disposed on a lateral portion of the housing, the downward facing surface facing away from the upper end portion,
wherein the downward facing surface is configured to rest on the upwardly facing support surface of the umbrella hub assembly.

2. The umbrella hub assembly of claim 1, wherein the housing of the battery pack comprises a radially inward facing side, a radially outward facing side and a radial projection projecting away from a radially outward facing surface on the radially outward facing side and wherein a circumferential surface comprises a notch configured to receive the radial projection of the housing of the battery pack when the battery pack is fully inserted into the power receptacle.

3. The umbrella hub assembly of claim 2, wherein the battery pack comprises a user interface disposed on the radial projection, the battery pack further comprising a processor disposed in the housing between the battery cell and the user interface and coupled with the user interface.

4. The umbrella hub assembly of claim 2, wherein the radial projection extends to a radial position corresponding to the outer periphery of the hub body when the housing is inserted into the power receptacle.

5. The umbrella hub assembly of claim 1, the battery pack further comprising a deflectable member disposed on a lateral surface of the housing, the downward facing surface being disposed on the deflectable member and wherein an opening of the power receptacle is laterally enclosed by a lateral wall of the hub body, an aperture being disposed through the lateral wall, the upwardly facing support surface being disposed along an edge of the aperture.

6. The umbrella hub assembly of claim 5, wherein a free end of the deflectable member is configured to deflect toward a longitudinal axis of the housing of the battery pack as the battery pack is inserted into the opening and to un-deflect into the aperture to allow the downward facing surface of the deflectable member to rest on the upwardly facing support surface of the umbrella hub assembly.

7. The umbrella hub assembly of claim 6, wherein the power receptacle comprises a manual button is disposed laterally of the aperture on an outside surface of the hub body, the manual button being deflectable toward a central vertical axis of the opening to deflect the free end of the deflectable member out of contact with the upwardly facing support surface to allow the battery pack to be withdrawn from the opening.

8. The umbrella hub assembly of claim 6, wherein the power receptacle comprises a manual button is disposed laterally of the aperture on an outside surface of the hub body, the manual button being deflectable toward a central vertical axis of the opening to deflect the free end of the deflectable member out of contact with the upwardly facing support surface to allow the battery pack to be withdrawn from the opening.

9. The umbrella hub assembly of claim 5, wherein the opening of the power receptacle is laterally enclosed by a lateral wall of the hub body, an aperture being disposed through the lateral wall, the upwardly facing support surface being disposed along an edge of the aperture.

10. The umbrella hub assembly of claim 5, wherein a free end of the deflectable member is configured to deflect toward a longitudinal axis of the housing of the battery pack as the battery pack is inserted into the opening and to un-deflect into the aperture to allow the downward facing surface of the deflectable member to rest on the upwardly facing support surface of the umbrella hub assembly.

11. An umbrella hub, comprising:

a body extending from an outer periphery and along a top portion and a bottom portion of the umbrella hub, the body being configured for connection of umbrella structural members thereto;

a power receptacle projecting from the bottom portion of the body, the power receptacle comprising an opening configured to receive at least a portion of a battery pack therein; and an upwardly facing support surface disposed within or adjacent to the opening, the upwardly facing support surface configured to be disposed under a downwardly facing surface of the battery pack when the battery pack is inserted into the opening to support the battery pack at a fixed elevation relative to the body of the umbrella hub.

12. The umbrella hub of claim 11, wherein the upwardly facing support surface is deflectable away from the opening as the battery pack is inserted into the opening.

13. The umbrella hub of claim 12, the power receptacle comprising a first cantilevered member having a fixed end coupled with the body of the umbrella hub and a free end opposite the fixed end, the free end comprising the upwardly facing support surface and a second cantilevered member on an opposite side of the opening from the first cantilevered member, the second cantilevered member having a free end comprising an upwardly facing support surface, and wherein an outwardly facing surface of the first cantilevered member is exposed on an outside surface of the body of the umbrella hub.

14. The umbrella hub of claim 11, wherein the power receptacle is bounded at least partially by a first circumferential surface disposed adjacent to an inner periphery, a second circumferential surface disposed adjacent to the outer periphery, a first end extending between the first circumferential surface and the second circumferential surface, and a second end extending between the first circumferential surface and the second circumferential surface opposite the first end, the upwardly facing support surface disposed on one of the first end and the second end.

15. The umbrella hub of claim 14, wherein the upwardly facing support surface is a first upwardly facing support surface disposed on the first end and further comprising a second upwardly facing support surface disposed on the second end.

16. The umbrella hub of claim 14, wherein the opening is a blind opening enclosed by a top surface of the power receptacle, the power receptacle configured to facilitate electrical contact at or through the top surface between a current source and/or a load disposed on or coupled with an umbrella in which the umbrella hub is disposed when the battery pack disposed in the opening.

17. The umbrella hub of claim 14, wherein the opening is laterally enclosed within lateral walls of the body, an aperture being disposed through one or more of the lateral walls, the upwardly facing support surface along an edge of the aperture.

18. A battery pack, comprising:

a housing comprising a side profile configured to allow the battery pack to be inserted into an opening of a power receptacle of an umbrella hub such that an upper portion of the housing can be disposed in the opening;

a battery cell disposed in the housing configured to supply or receive power through a contact disposed at an upper end of the battery pack; and a downwardly facing surface disposed on a lateral portion of the housing, the downwardly facing surface facing away from the upper portion of the housing and defining a transition between a first width of the upper portion of the housing and a second width of the housing, the first width being greater than the second width;

wherein the downwardly facing surface is configured to rest on an upwardly facing support surface of the umbrella hub when the upper portion of the housing is disposed in the opening of the power receptacle of the umbrella hub.

19. The battery pack of claim 18, wherein the housing of the battery pack comprises a radially inward facing side, a radially outward facing side and a radial projection projecting away from a radially outward facing surface on the radially outward facing side.

20. The battery pack of claim 19, further comprising a user interface disposed on the radial projection, the battery pack further comprising a processor disposed in the housing between the battery cell and the user interface and coupled with the user interface.

21. The battery pack of claim 18, further comprising a magnet disposed in the battery pack configured to be magnetically attracted to the power receptacle of the umbrella hub.

22. The battery pack of claim 18, wherein the downwardly facing surface is disposed on a fixed shoulder of the housing.

23. The battery pack of claim 18, further comprising a deflectable member disposed on a lateral surface of the housing, the deflectable member having a fixed end disposed above a free end, the downwardly facing surface being disposed on the free end of the deflectable member below the fixed end.

24. The battery pack of claim 18, wherein the downwardly facing surface is in a fixed position.

\*  \*  \*  \*  \*